(12) United States Patent
Park

(10) Patent No.: US 12,302,452 B2
(45) Date of Patent: *May 13, 2025

(54) METHOD AND APPARATUS FOR TRANSMITTING AND RECEIVING A SIGNAL IN A WIRELESS COMMUNICATION SYSTEM

(71) Applicant: Innovative Technology Lab Co., Ltd., Seoul (KR)

(72) Inventor: Dong Hyun Park, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/309,777

(22) Filed: Apr. 29, 2023

(65) Prior Publication Data

US 2023/0292099 A1 Sep. 14, 2023

Related U.S. Application Data

(63) Continuation of application No. 17/460,985, filed on Aug. 30, 2021, now Pat. No. 11,678,170, which is a
(Continued)

(30) Foreign Application Priority Data

Aug. 8, 2014 (KR) .......................... 10-2014-0102674

(51) Int. Cl.
*H04W 8/00* (2009.01)
*H04W 48/12* (2009.01)
(Continued)

(52) U.S. Cl.
CPC ........... *H04W 8/005* (2013.01); *H04W 48/12* (2013.01); *H04W 74/0833* (2013.01); *H04W 72/23* (2023.01); *H04W 76/14* (2018.02)

(58) Field of Classification Search
CPC . H04W 8/005; H04W 48/12; H04W 74/0833; H04W 76/14; H04W 72/1289
See application file for complete search history.

(56) References Cited

U.S. PATENT DOCUMENTS 9,967,912 B2 * 5/2018 Kazmi ................. H04W 8/005
10,178,539 B2 * 1/2019 Park ...................... H04W 48/12
(Continued)

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 12)," 3GPP TS 36.321 V12.2.1, Jun. 2014, pp. 1-57, 3GPP.
(Continued)

*Primary Examiner* — Michael J Moore, Jr.

(57) ABSTRACT

A method includes receiving, by a user equipment (UE) and through Radio Resource Control (RRC) signaling, information of a resource pool for a D2D communication, wherein the information of the resource pool comprises information of a discovery subframe in which a D2D discovery signal is to be communicated, determining that in the discovery subframe, the D2D discovery signal is prioritized over a communication with an evolved NodeB (eNB) unless the communication with the eNB is associated with a random access (RA) procedure, transmitting a RA preamble through a Physical Random Access Channel (PRACH), determining whether the discovery subframe corresponds to a RA subframe in which a RA response for the UE is to be monitored, and in response to determining that the discovery subframe corresponds to the RA subframe, monitoring, by the UE, the RA response during the discovery subframe.

20 Claims, 23 Drawing Sheets

Related U.S. Application Data continuation of application No. 16/830,927, filed on Mar. 26, 2020, now Pat. No. 11,140,540, which is a continuation of application No. 16/203,786, filed on Nov. 29, 2018, now Pat. No. 10,638,302, which is a continuation of application No. 15/427,388, filed on Feb. 8, 2017, now Pat. No. 10,178,539, which is a continuation of application No. PCT/KR2015/008256, filed on Aug. 6, 2015.

(51) Int. Cl.
*H04W 74/0833* (2024.01)
*H04W 72/23* (2023.01)
*H04W 76/14* (2018.01)

(56) References Cited

U.S. PATENT DOCUMENTS

| | | | | |
|---|---|---|---|---|
| 10,638,302 | B2* | 4/2020 | Park | H04W 48/12 |
| 11,140,540 | B2* | 10/2021 | Park | H04W 74/0833 |
| 11,678,170 | B2* | 6/2023 | Park | H04W 74/0833 |
| | | | | 370/254 |
| 2011/0255450 | A1 | 10/2011 | Wang et al. | |
| 2014/0376458 | A1* | 12/2014 | Ryu | H04W 72/542 |
| | | | | 370/329 |
| 2015/0043448 | A1* | 2/2015 | Chatterjee | H04W 76/14 |
| | | | | 370/329 |
| 2015/0208440 | A1* | 7/2015 | Agiwal | H04W 74/085 |
| | | | | 370/329 |
| 2015/0245193 | A1* | 8/2015 | Xiong | H04W 4/80 |
| | | | | 370/328 |
| 2015/0282132 | A1* | 10/2015 | Kim | H04W 76/11 |
| | | | | 370/329 |
| 2015/0326373 | A1* | 11/2015 | Ryu | H04L 5/0092 |
| | | | | 370/329 |
| 2016/0044619 | A1* | 2/2016 | Ryu | H04W 72/23 |
| | | | | 370/350 |
| 2016/0081108 | A1* | 3/2016 | Tseng | H04W 72/569 |
| | | | | 370/329 |
| 2017/0055232 | A1* | 2/2017 | Kim | H04W 56/001 |
| 2017/0142741 | A1* | 5/2017 | Kaur | H04W 72/02 |
| 2017/0150340 | A1* | 5/2017 | Park | H04W 74/0833 |
| 2017/0215160 | A1* | 7/2017 | Löhr | H04W 76/14 |
| 2017/0280482 | A1* | 9/2017 | Chatterjee | H04W 48/04 |
| 2017/0295597 | A1* | 10/2017 | Lee | H04W 72/04 |
| 2017/0310415 | A1* | 10/2017 | Thangarasa | H04W 72/12 |
| 2017/0367059 | A1* | 12/2017 | Park | H04L 5/0048 |

OTHER PUBLICATIONS

International Search Report for International Patent Application No. PCT/KR2015/008256, dated Nov. 16, 2015.
Written Opinion for International Patent Application No. PCT/KR2015/008256, dated Nov. 16, 2015.
LG Electronics, "Coexistence issues of WAN and D2D on multiple carriers", R1-142153, 3GPP TSG RAN WG1 Meeting #77, Seoul, Korea, May 19-23, 2014, pp. 1-4.
LG Electronics, "Multiplexing of Uu and D2D discovery signal", R1-140338, 3GPP TSG RAN WG1 Meeting #76, Prague, Czech Republic, Feb. 10-14, 2014, pp. 1-4.
LG Electronics, "Multiplexing of Uu and D2D communication", R1-140335, 3GPP TSG RAN WG1 Meeting #76, Prague, Czech Republic, Feb. 10-14, 2014, pp. 1-7.
Samsung, "Multiplexing between WAN and D2D from system perspective", R1-140394, 3GPP TSG RAN WG1 Meeting #76, Prague, Czech Republic, Feb. 10-14, 2014, pp. 1-5.
"Resource pool configuration for type-1 discovery", R1-141303, Samsung, 3GPP TSG RAN WG1 Meeting #76bis, Shenzhen, China, Apr. 4-31, 2014.
"Coexistence of D2D discovery and WAN", R1-141456, Qualcomm Incorporated, 3GPP TSG RAN WG1 Meeting #76bis, Shenzhen, China, Apr. 31-4, 2014.

* cited by examiner

METHOD AND APPARATUS FOR TRANSMITTING AND RECEIVING A SIGNAL IN A WIRELESS COMMUNICATION SYSTEM

CROSS-REFERENCE TO RELATED APPLICATIONS

This application is a continuation of a U.S. patent application Ser. No. 17/460,985, filed on Aug. 30, 2021, which a continuation of a U.S. patent application Ser. No. 16/830,927, filed on Mar. 26, 2020, now issued as U.S. Pat. No. 11,140,540 on Oct. 5, 2021, which is a continuation of a U.S. patent application Ser. No. 16/203,786, filed on Nov. 29, 2018, now issued as U.S. Pat. No. 10,638,302 on Apr. 28, 2020, which is a continuation of a U.S. patent application Ser. No. 15/427,388, filed on Feb. 8, 2017, now issued as U.S. Pat. No. 10,178,539 on Jan. 8, 2019, which is a continuation of International Patent Application No. PCT/KR2015/008256, filed on Aug. 6, 2015, which claims priority from and the benefit of Korean Patent Application No. 10-2014-0102674, filed on Aug. 8, 2014, each of which is hereby incorporated by reference in its entirety.

BACKGROUND

1. Field

The present disclosure relates to wireless communication, and more particularly, to a method and apparatus for selectively transmitting and receiving a user equipment (UE)-to-UE signal and a UE-to-evolved node B (eNB) signal in a wireless communication system.

2. Discussion of the Background

Long term evolution (LTE) of the $3^{rd}$ generation partnership project (3GPP) allows supporting a proximity service (ProSe) in order to satisfy the needs of public safety agencies. The LTE system requires technology that provides backward and/or forward compatibility because discovery technology and broadcasting communication have been added to a proximity-based service. A representative technology of a proximity-based application technology is device to device (D2D) communication, which has been utilized since the emergence of the analog radio set.

However, the D2D communication in a mobile wireless communication system, e.g., LTE, LTE-A, is distinct from existing D2D communication systems. The D2D communication in a mobile wireless communication system indicates communication that directly transmits and receives data between UEs without passing through an infrastructure node (e.g., an eNB) of the wireless communication system. That is, each of two UEs becomes a source and a destination of direct data communication therebetween. D2D communication may efficiently use a limited amount of radio resources, may reduce the load of the wireless communication system, and may enable communication without a network, which is an advantage.

D2D communication may be performed using a communication scheme that uses a non-licensed band such as Bluetooth or a wireless LAN. However, communication schemes that use non-licensed bands have difficulty providing a planned and controlled service, which is a drawback. Particularly, performance may be dramatically reduced by interference. Conversely, device-to-device direct communication, which may be operated or provided in a licensed band or an environment where inter-system interference is under control, may be capable of ensuring quality of service (QoS), raising frequency utilization efficiency through frequency reuse, and increasing a distance in which the communication between the devices is reliable.

In the D2D communication of the wireless communication system described above, a UE having a single transceiver chain is incapable of performing transmission or reception in multiple bands in parallel. Therefore, there is a need for a method of efficiently transmitting and receiving a D2D signal while reducing any burden or restrictions on an existing LTE signal in the LTE frequency band (FDD/TDD).

SUMMARY

An aspect of the present disclosure is to provide a method and apparatus for multiplexing a signal in a wireless communication system that supports D2D communication.

Another aspect of the present disclosure is to provide a method and apparatus for selectively transmitting or receiving a user equipment (UE)-to-UE signal and a UE-to-evolved node B (eNB) signal in a wireless communication system that supports D2D communication.

Another aspect of the present disclosure is to provide a method and apparatus for selectively transmitting or receiving a D2D reception signal and a WAN reception signal in a wireless communication system that supports D2D communication.

Another aspect of the present disclosure is to provide a method and apparatus for selectively transmitting or receiving a D2D reception signal and a WAN transmission signal in a wireless communication system that supports D2D communication.

Another aspect of the present disclosure is to provide a method and apparatus for selectively transmitting or receiving a D2D transmission signal and a WAN transmission signal in a wireless communication system that supports D2D communication.

Another aspect of the present disclosure is to provide a method and apparatus for selectively transmitting or receiving a D2D transmission signal and a WAN reception signal in a wireless communication system that supports D2D communication.

An exemplary embodiment provides a method of performing a random access procedure during a device-to-device (D2D) discovery period, the method including: receiving, by a user equipment (UE) and through Radio Resource Control (RRC) signaling, information of a resource pool for a D2D communication, wherein the information of the resource pool includes information of a discovery subframe in which a D2D discovery signal is to be communicated; determining that in the discovery subframe, the D2D discovery signal is prioritized over a communication with an evolved NodeB (eNB) unless the communication with the eNB is associated with a random access (RA) procedure; transmitting a RA preamble through a Physical Random Access Channel (PRACH); determining whether the discovery subframe corresponds to a RA subframe in which a RA response for the UE is to be monitored; and in response to determining that the discovery subframe corresponds to the RA subframe, monitoring, by the UE, the RA response during the discovery subframe.

An exemplary embodiment provides a method of performing a random access procedure during a device-to-device (D2D) discovery period, the method including: determining, by a user equipment (UE), a discovery period including one or more of a discovery transmission subframe or a discovery reception subframe, wherein the discovery transmission subframe is configured for the UE to transmit a D2D discovery signal to discover a different UE, and the discovery reception subframe is configured for the UE to monitor reception of a D2D discovery signal transmitted from a different UE; determining that in the discovery period, a D2D discovery communication between UEs is prioritized over a Wide Area Network (WAN) communication with an evolved NodeB (eNB) unless the WAN communication with the eNB is associated with a random access (RA) procedure; transmitting a RA preamble through a Physical Random Access Channel (PRACH); determining a RA response monitoring period in which a RA response for the UE is to be monitored; and in response to determining that at least part of the RA response monitoring period overlaps the discovery period, monitoring, by the UE, the RA response during the overlapped discovery period.

An exemplary embodiment provides a method of performing a random access procedure during a device-to-device (D2D) discovery period, the method including: receiving, by a user equipment (UE) and through Radio Resource Control (RRC) signaling, information of a resource pool for a D2D communication, wherein the information of the resource pool includes information of a discovery subframe in which a D2D discovery signal is to be communicated; determining that in the discovery subframe, the D2D discovery signal is prioritized over a communication with an evolved NodeB (eNB) unless the communication with the eNB is associated with a random access (RA) procedure; transmitting a RA preamble through a Physical Random Access Channel (PRACH); determining a RA response received during a RA monitoring period in which the RA response for the UE is to be monitored; determining whether the discovery subframe corresponds to a RA subframe in which a message responsive to the RA response for the UE is to be processed; and in response to determining that the discovery subframe corresponds to the RA subframe, processing, by the UE, the message responsive to the RA response during the discovery subframe.

According to the present disclosure, although a user equipment (UE) has limited capacity (e.g., a single transceiver chain), the UE may be capable of multiplexing D2D ProSe Direct Communication and D2D discovery in a band/cell that supports legacy LTE signals.

According to the present disclosure, a system may be capable of receiving a larger number of D2D UEs without a significant decrease in the quality of a legacy LTE signal, irrespective of the RF capacity of a cell managed by a corresponding network. Therefore, a D2D UE may be deployed more quickly and the legacy LTE market volume may increase.

DETAILED DESCRIPTION OF THE ILLUSTRATED EMBODIMENTS

Figure 1:
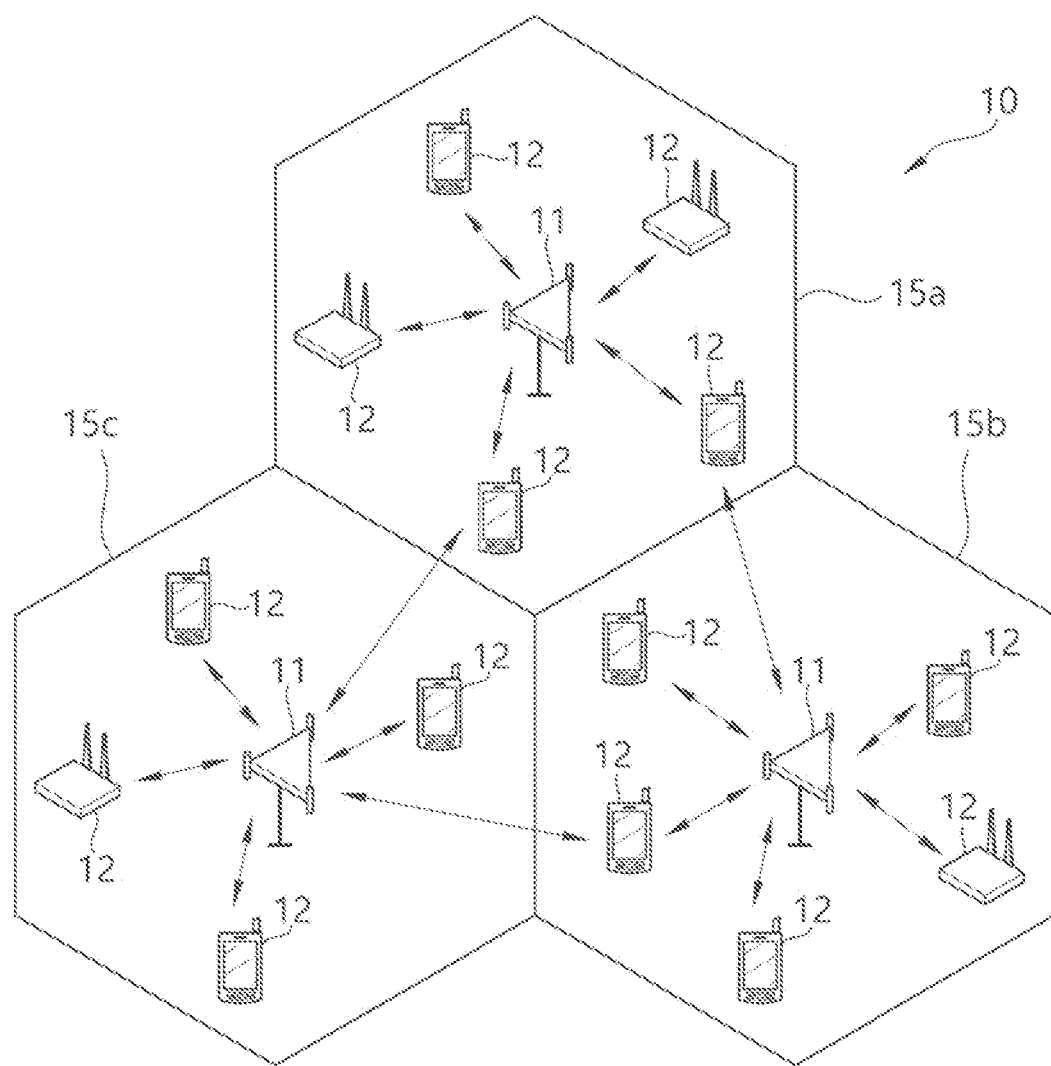
FIG. 1 is a diagram illustrating a wireless communication system according to the present disclosure.

FIG. 1 is a diagram illustrating a wireless communication system according to the present disclosure.

Referring to FIG. 1, a wireless communication system 10 is widely installed to provide various communication services such as a voice service, a packet data service, or the like. The wireless communication system 10 includes at least one evolved node B 11 (eNB). Each eNB 11 provides a communication service with respect to a predetermined cell 15a, 15b, and 15c. A cell may be divided into a plurality of areas (referred to as sectors).

A user equipment (UE) 12 may be fixed or may have mobility, and may be referred to by another term, such as a mobile station (MS), a mobile terminal (MT), a user terminal (UT), a subscriber station (SS), a wireless device, a personal digital assistant (PDA), a wireless modem, a handheld device, or the like. The eNB 11 may be referred to by another term, such as a base station (BS), a base transceiver system (BTS), an access point, a femto base station, a home node B, a relay, or the like. A cell is a concept including various types of coverage areas, such as a megacell, a macrocell, a microcell, a picocell, a femtocell, and the like. Hereinafter, a downlink (DL) indicates communication from the eNB 11 to the UE 12, and an uplink (UL) indicates communication from the UE 12 to the eNB 11. In a downlink, a transmitter may be a part of the eNB 11 and a receiver may be a part of the UE 12. In an uplink, a transmitter may be a part of the UE 12 and a receiver may be a part of the eNB 11. A multiple access scheme applied to a wireless communication system may not be limited. Various multiple access schemes, such as Code Division Multiple Access (CDMA), Time Division Multiple Access (TDMA), Frequency Division Multiple Access (FDMA), Orthogonal Frequency Division Multiple Access (OFDMA), Single Carrier-FDMA (SC-FDMA), OFDM-FDMA, OFDM-TDMA, or OFDM-CDMA, may be used. An uplink transmission and a downlink transmission may use a Time Division Duplex (TDD) scheme that performs transmissions at different times, or may use a Frequency Division Duplex (FDD) scheme that performs transmissions at different frequencies.

The layers of a radio interface protocol between a UE and an eNB may be distinguished as a first layer (L1), a second layer (L2), and a third layer (L3) based on the lower three layers of the well-known open system interconnection (OSI) model in a communication system. Among them, a physical layer belonging to the first layer may provide an information transfer service using a physical channel.

The physical layer may be connected to a higher Media Access Control (MAC) layer through a transport channel. Data may be transferred through the transport channel between the MAC layer and the physical layer. The transport channel may be classified based on how data is transferred through a wireless interface. Also, data may be transferred through a physical channel between different physical layers (that is, the physical layers of a UE and an eNB). The physical channel may be modulated based on an Orthogonal Frequency Division Multiplexing (OFMD) scheme, and may utilize a space formed based on time, frequencies, and a plurality of antennas as a radio resource.

Figure 2:
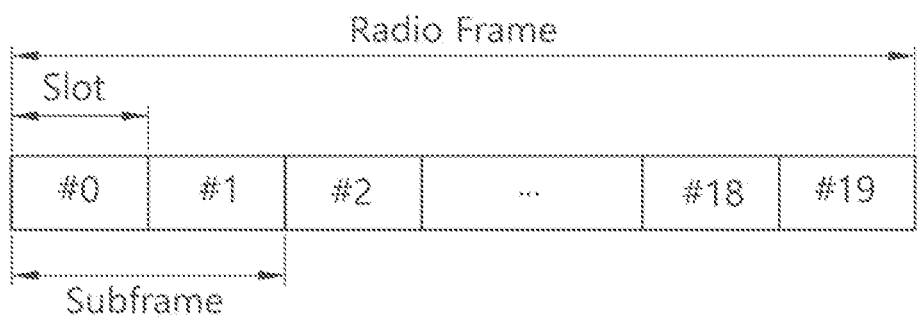
FIGS. 2 and 3 are diagrams schematically illustrating the structure of a radio frame according to the present disclosure.
Figure 3:
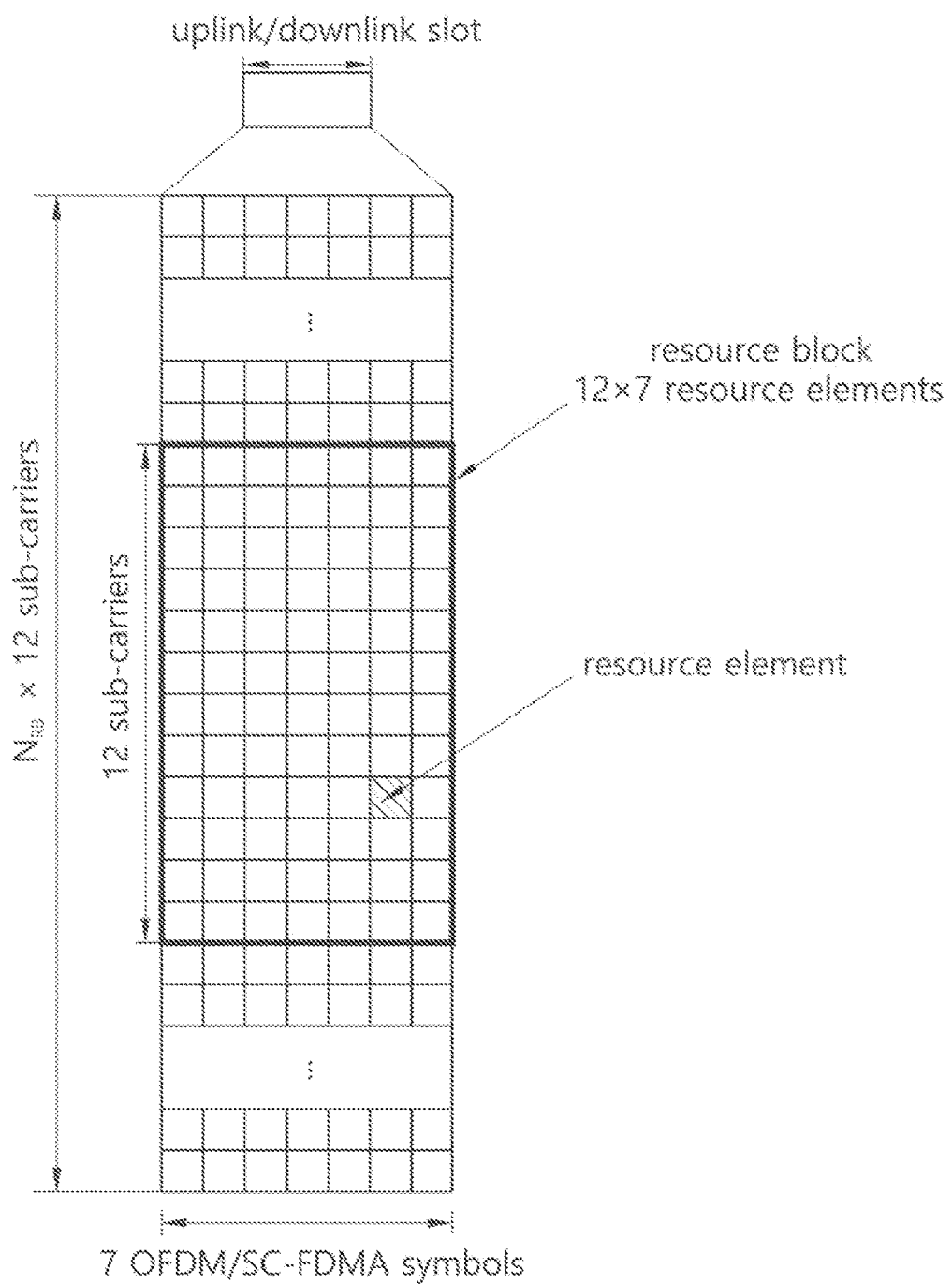

FIGS. 2 and 3 are diagrams schematically illustrating the structure of a radio frame according to the present disclosure. Particularly, FIG. 2 is a diagram illustrating the concept of cellular network-based D2D communication system according to the present disclosure, and FIG. 3 is a diagram illustrating an example of the structure of a D2D discovery resource configuration. Referring to FIGS. 2 and 3, a single radio frame includes 10 subframes, and a single subframe includes two consecutive slots. A basic time (length) unit for controlling transmission in a radio frame is referred to as a transmission time interval (TTI). TTI may be 1 ms. The length of a single subframe (1 subframe) may be 1 ms, and the length of a single slot (1 slot) may be 0.5 ms.

A single slot may include a plurality of symbols in the time domain. For example, in a wireless system that uses Orthogonal Frequency Division Multiple Access (OFDMA) in the downlink (DL), the symbol may be an Orthogonal Frequency Division Multiplexing (OFDM) symbol. In a wireless system that uses Single Carrier-Frequency Division Multiple Access (SC-FDMA) in the uplink (UL), the symbol may be an SC-FDMA symbol. An expression associated with a symbol period of the time domain may not be limited by a multiple access scheme or name.

The number of symbols included in a single slot may be different based on the length of a cyclic prefix (CP). For example, in the case of a normal CP, seven symbols are included in a single slot. In the case of an extended CP, six symbols are included in a single slot.

A resource element (RE) refers to the minimum time-frequency unit to which a modulated symbol of a data channel, a modulated symbol of a control channel, or the like is mapped. A resource block (RB) is a resource allocation unit, and may include a time-frequency resource corresponding to 180 kHz in the frequency axis and a single slot in the time axis. The RB may be referred to as a physical resource block (PRB). A resource block pair indicates a resource block unit that includes two consecutive slots in the time axis.

Various physical channels may be used in the physical layer; the physical channels may be mapped to the radio frame and transmitted. As a downlink physical channel, a Physical Downlink Control Channel (PDCCH)/Enhanced PDCCH (EPDCCH) may inform a UE of resource allocation of a Downlink Shared Channel (DL-SCH) and a Paging Channel (PCH), as well as Hybrid Automatic Repeat Request (HARM) information associated with the DL-SCH. The PDCCH/EPDCCH may carry an uplink grant that informs a UE of the resource allocation of an uplink transmission. The PDCCH and the EPDCCH are mapped to different resource areas. A DL-SCH may be mapped to a Physical Downlink Shared Channel (PDSCH) A Physical Control Format Indicator Channel (PCFICH) informs a UE of the number of OFDM symbols used for a PDCCH, and is transmitted for each subframe. A Physical Hybrid ARQ Indicator Channel (PHICH) is a downlink channel, and carries a Hybrid Automatic Repeat ReQuest (HARQ) Acknowledgement (ACK)/Non-acknowledgement (NACK) signal, which is a response to an uplink transmission. A HARQ ACK/NACK signal may be referred to as a HARQ-ACK signal.

As an uplink physical channel, a Physical Random Access Channel (PRACH) carries a random access preamble. A Physical Uplink Control Channel (PUCCH) carries uplink control information, such as channel status information (CSI) indicating a downlink channel status, for example, a channel quality indicator (CQI), a precoding matrix index (PMI), a precoding type indicator (PTI), a rank indicator (RI), and a HARQ-ACK which is a response to a downlink transmission. A Physical Uplink Shared Channel (PUSCH) carries an Uplink Shared Channel (UL-SCH).

Uplink data may be transmitted on the PUSCH; this uplink data may be a transport block (TB) that is a data block for a UL-SCH transmitted during a transmission time interval (TTI). The TB may include user data. Alternatively, uplink data may be multiplexed data. Multiplexed data may be obtained by multiplexing a transport block for a UL-SCH and uplink control information; that is, when user data that needs to be transmitted in the uplink exists, uplink control information may be multiplexed with the user data and may be transmitted through the PUSCH.

Recently, a method for supporting D2D communication has been considered wherein UEs utilize transmission/reception technologies of a wireless communication system in the frequency band of the wireless communication system or other bands, and directly exchange user data between the UEs without passing through an infrastructure node (for example, an eNB). This D2D communication may allow for wireless communication in an area outside the limited wireless communication infrastructure, and may reduce loads on the wireless communication network. Also, the D2D communication may provide disaster information to UEs even when eNBs do not smoothly operate under war or disaster situations, which is an advantage.

A UE that transmits a signal based on the D2D communication is defined as a transmission UE (Tx UE), and a UE that receives a signal based on the D2D communication is defined as a reception UE (Rx UE). The Tx UE transmits a discovery signal, a D2D control signal, or a D2D data signal. The Rx UE receives a discovery signal, a D2D control signal, or a D2D data signal. The Tx UE and the Rx UE may operate by exchanging their roles. A signal transmitted by the Tx UE may be received by two or more Rx UEs. Alternatively, signals transmitted by two or more Tx UEs may be selectively received by a single Rx UE. A D2D signal may be transmitted through an uplink resource. Therefore, a D2D signal may be mapped to an uplink subframe and may be transmitted from the Tx UE to the Rx UE. The Rx UE may receive a D2D signal on the uplink subframe.

Figure 4:
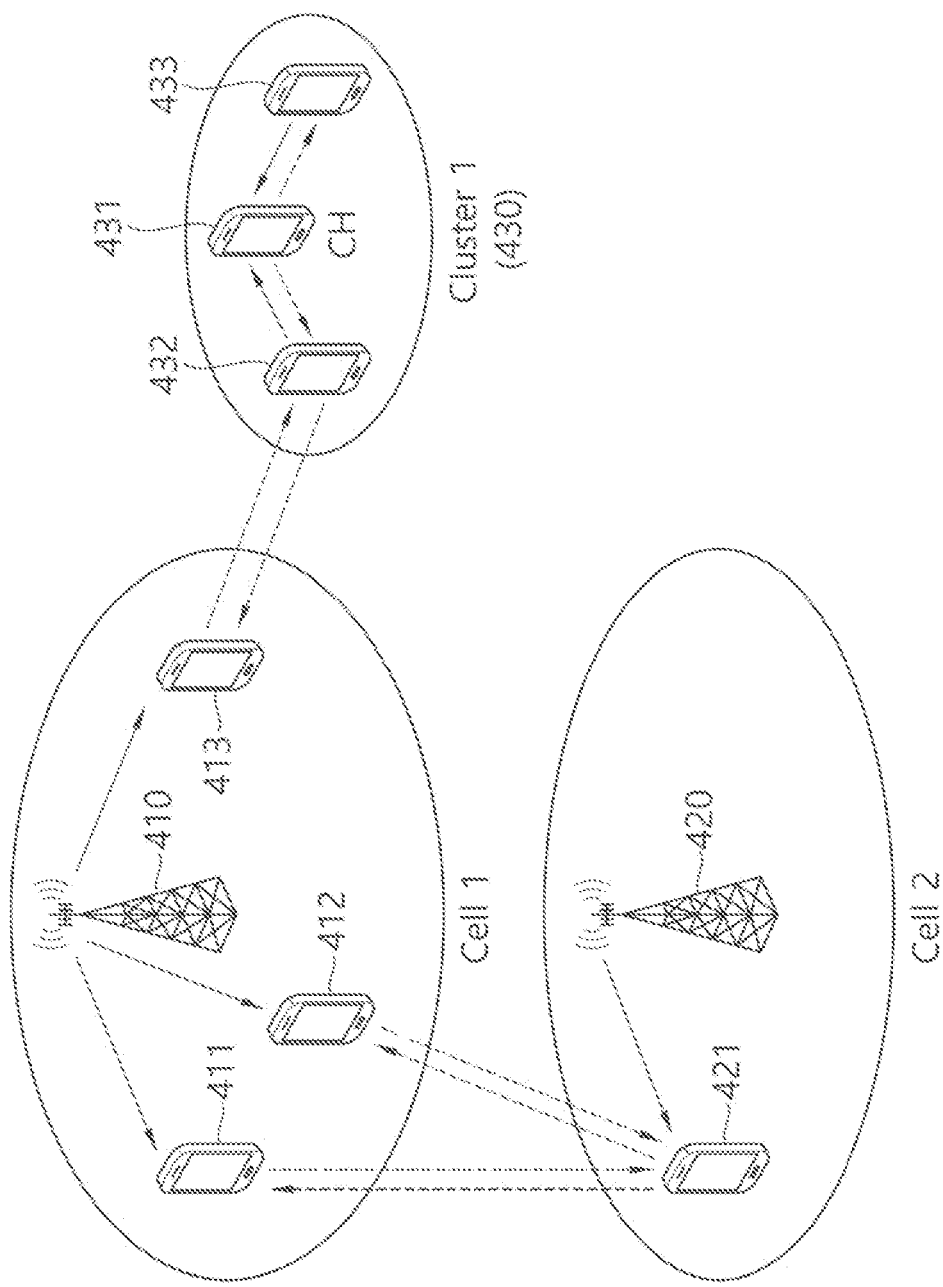
FIG. 4 is a diagram illustrating the concept of cellular network-based D2D communication according to the present disclosure.

FIG. 4 is a diagram illustrating the concept of cellular network-based D2D communication according to the present disclosure.

Referring to FIG. 4, a cellular communication network including a first eNB 410, a second eNB 420, and a first cluster 430 is configured. A first UE 411 and a second UE 412 included in a cell provided by the first eNB 410 may execute communication with a general access link (cellular link) through the first eNB 410. This is an in-coverage-single-cell D2D communication scenario. The first UE 411 belonging to the first eNB 410 may execute D2D communication with a fourth UE 421 belonging to the second eNB 420. This is an in-coverage-multi-cell D2D communication scenario. Also, a fifth UE 431 belonging to the outside of a network coverage may generate single cluster 430 with a sixth UE 432 and a seventh UE 433, and may perform D2D communication with them. This is an out-of-coverage D2D communication scenario. Here, the fifth UE 431 may operate as a cluster head (CH) of the first cluster. A cluster head is a UE (or unit) used as a reference for at least the purpose of synchronization and, occasionally, indicates a UE that allocates a resource for different purposes. The cluster head may include an Independent Synchronization Source (ISS) for the synchronization of out-of-coverage UEs.

Also, the third UE 413 may perform D2D communication with the sixth UE 432, which corresponds to a partial-coverage D2D communication scenario.

D2D communication may include direct communication in which D2D UEs transmit and receive data and control information for the purpose of public safety. To support the D2D communication, a D2D discovery procedure and a D2D synchronization procedure may be executed. A D2D discovery signal may be used solely for commercial purposes (e.g., advertising or the like).

To perform a D2D data transmission/reception through D2D communication, D2D control information needs to be transmitted/received between UEs. The D2D control information may be referred to as a scheduling assignment (SA) or D2D SA. A D2D Rx UE may perform a D2D data reception based on the SA. The SA may include, for example, at least one of: a new data indicator (NDI), a target identification (target ID), a redundancy version (RV) indicator, a modulation and coding scheme (MCS) indication, a resource pattern for transmission (RPT) indication, and a power control indication.

Here, the NDI indicates whether a current transmission is a repetition (i.e., a retransmission) or a new transmission. A receiver may combine the same data based on the NDI. The target ID indicates an ID of terminals (UEs) to which a corresponding data MAC PDU is to be transmitted. The data MAC PDU may be transmitted through group casting or broadcasting based on the ID value, and may be transmitted even through uni-casting based on the settings. The RV indicator indicates a redundancy version by specifying different start points in a circular buffer for reading an encoded buffer. Based on the RV indicator, a Tx UE may choose various redundancy versions associated with a repeated transmission of the same packet. The MCS indication indicates an MCS level for D2D communication. However, an MCS for D2D communication (e.g., SA or data) may be fixed to a QPSK. The RPT indication indicates a time/frequency physical resource in which corresponding D2D data is allocated and transmitted. The power control indication is an instruction used when a UE that receives corresponding information controls the magnitude of power to be appropriate for a corresponding D2D transmission.

From the perspective of a Tx UE, the Tx UE may perform resource allocation for D2D communication in two modes.

Mode 1 is the case in which an eNB or a relay node (hereinafter an eNB includes a relay node) schedules pre-determined resources for D2D communication. That is, in mode 1, a predetermined resource used for transmitting D2D data and D2D control information of a Tx UE may be designated by an eNB or a relay node. Mode 2 is the case in which a UE directly selects one or more predetermined resources from a resource pool. That is, in mode 2, a Tx UE directly selects predetermined resources to be used for transmitting D2D data and D2D control information.

A D2D communication-enabled UE supports at least mode 1 or mode 2 for the in-coverage D2D communication. The D2D communication-enabled UE may support mode 2 for the out-of-coverage or edge-of-coverage D2D communication.

In mode 1, the location of a resource(s) for a D2D control information transmission and the location of a resource(s) for a D2D data transmission are given by an eNB. That is, the same grant for a D2D SA transmission and a data transmission is given from the eNB to a UE through the transmission of an (E)PDCCH in the form of a DCI message having the same size as DCI format 0.

In mode 2, a resource pool for a D2D control information transmission (e.g., SA) may be pre-configured and/or semi-statically allocated. In this instance, a Tx UE may select a resource for D2D control information from the resource pool so as to transmit the D2D control information.

D2D discovery may be performed on a D2D discovery resource. For example, a D2D UE may transmit a discovery signal through a discovery resource (hereinafter, D2D discovery resource) that is randomly selected (outside of network coverage) or set by an eNB (inside of network coverage), within each discovery period. When a resource is randomly selected, a resource for transmitting a discovery signal may be determined based on a pre-configured or configured nominal transmission probability or based on a fixed or adaptive transmission probability.

Figure 5:
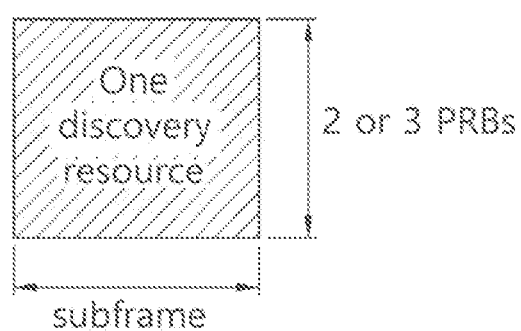
FIG. 5 is a diagram illustrating an example of a D2D discovery resource according to the present disclosure.

FIG. 5 is a diagram illustrating an example of a D2D discovery resource according to the present disclosure.

Referring to FIG. 5, a single D2D discovery resource may be formed of n contiguous PRBs and a single subframe in the frequency domain. n may be, for example, 2 or 3. In this instance, inter-slot frequency hopping is not executed in the subframe.

A set of D2D resources may be used for a repeated transmission of a Medium Access Control Protocol Data Unit (MAC PDU) that delivers a discovery signal (hereinafter referred to as a discovery MAC PDU) within a discovery period.

Figure 6:
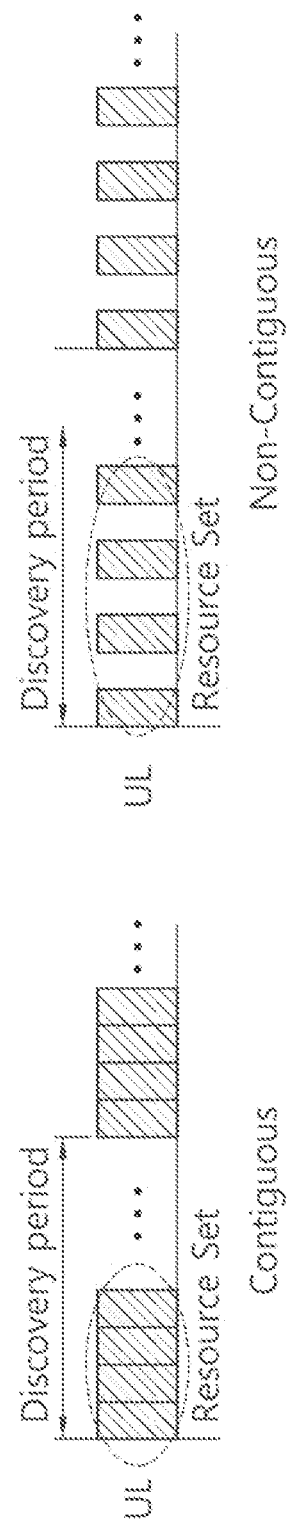
FIG. 6 is a diagram illustrating examples of a D2D discovery resource set according to the present disclosure.

FIG. 6 is a diagram illustrating examples of a D2D discovery resource set according to the present disclosure.

Referring to FIG. 6, a D2D discovery resource set within a discovery period may include contiguous D2D discovery resources or non-contiguous D2D discovery resources, in the time domain. That is, repeated D2D discovery resources in the D2D discovery resource set may be contiguous or non-contiguous in the time domain.

Figure 7:
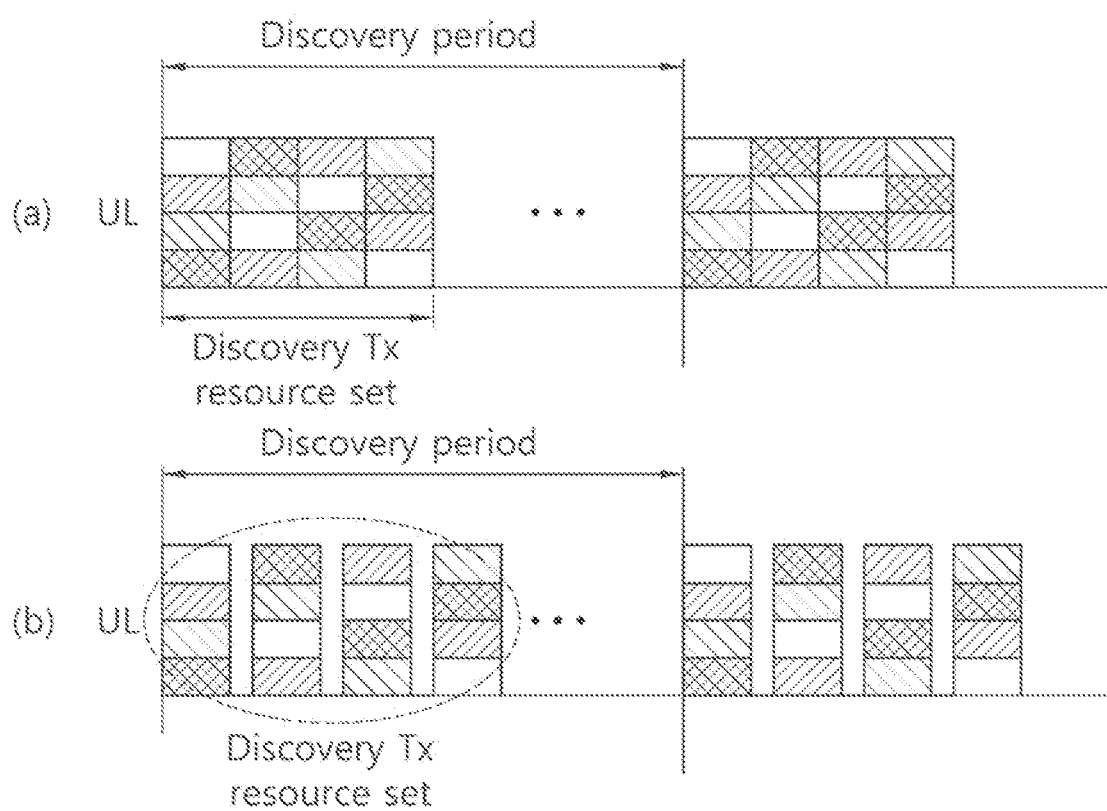
FIG. 7 is a diagram illustrating examples of a structure of a D2D discovery resource configuration in a D2D discovery resource set according to the present disclosure.

FIG. 7 is a diagram illustrating examples of a D2D discovery resource configuration structure in a D2D discovery resource set according to the present disclosure.

Referring to FIG. 7, patterns indicate resources included in each D2D discovery resource set. A plurality of D2D discovery resource sets may exist in a single discovery period, and D2D discovery resources in a single D2D discovery resource set may be contiguous or non-contiguous in the time axis, and may be arranged in the frequency axis based on frequency hopping (inter-subframe frequency hopping). From the perspective of an Rx UE, a discovery signal may be monitored within a resource pool for a D2D reception. The resource pool for a corresponding D2D reception may be in the form of a super set, when compared to a resource pool for a D2D transmission.

The definition of a discovery period may be distinguished based on a discovery type, that is, discovery type 1 and discovery type 2B. In the case of type 1, the discovery period indicates periodicity of resources allocated for a D2D discovery signal transmission within a cell. In the case of type 2B, the discovery period indicates the periodicity of resources for a D2D discovery signal reception from a cell. Multiple discovery periods having various lengths may be used. In the case of type 2B, a network may configure predetermined resources for D2D discovery signal transmission.

To determine whether to transmit a D2D discovery signal, a D2D discovery transmission probability may be set.

A D2D UE that executes a D2D discovery signal transmission may randomly select resources and transmit a discovery MAC PDU within a discovery period. In this instance, the UE may not transmit a discovery MAC PDU in every discovery period, but may determine whether to transmit a discovery MAC PDU on a corresponding resource. The UE may determine whether to transmit a MAC PDU on a corresponding resource based on a D2D discovery transmission probability. The UE selects discovery resources in a discovery resource set within a set discovery period, randomly (type 1) or based on a network configuration (type 2), and repeatedly transmits a discovery MAC PDU on the selected discovery resources.

For example, the D2D discovery transmission probability may be determined based on a period/offset. That is, a discovery period number and a time/frequency offset are given, and the UE may transmit a D2D discovery signal at a corresponding point.

As another example, the D2D discovery transmission probability may be based on a fixed probability or an adaptive probability. (1) When it is based on a fixed probability, whether to transmit a D2D discovery signal on a discovery resource may be determined based on a random function including a probability value P. (2) When it is based on an adaptive probability, this case may be similar to the case based on the fixed probability but the probability value P may adaptively vary. For example, when a D2D discovery signal transmission is not executed in a previous period, the probability value P may increase by k, and when a D2D discovery signal transmission is executed, the probability value P may increase by m. Alternatively, the probability value P may increase gradually, and may decrease by a predetermined value when a predetermined condition is satisfied.

In the present disclosure, it is assumed that a D2D synchronization Signal (D2DSS) and a Physical D2D Synchronization Channel (PD2DCH) are located in a resource that is configured by a network or determined in advance in order to effectively support D2D discovery or D2D communication. Therefore, when a D2DSS or a PD2DSCH is located in a resource for D2D discovery or D2D communication (SA/data), a D2D signal and a Wide Area Network (WAN) signal may be multiplexed in the corresponding resource. The WAN refers to a network that configures a wide coverage in an existing cellular network and provides mobile UEs with voice/data traffic. The WAN may correspond to WCDMA, LTE, WiMAX, and the like. Radio access networks are generally referred to as a WAN.

FIGS. 8 to 12 are diagrams illustrating delivery of information among UEs and an eNB for D2D communication according to the present disclosure. As an example, FIGS. 8 to 12 are flowcharts showing resource configuration and transmission/reception of signals among an eNB, a D2D Tx UE, and a D2D Rx UE, in association with D2D discovery signals and data communication.

Figure 8:
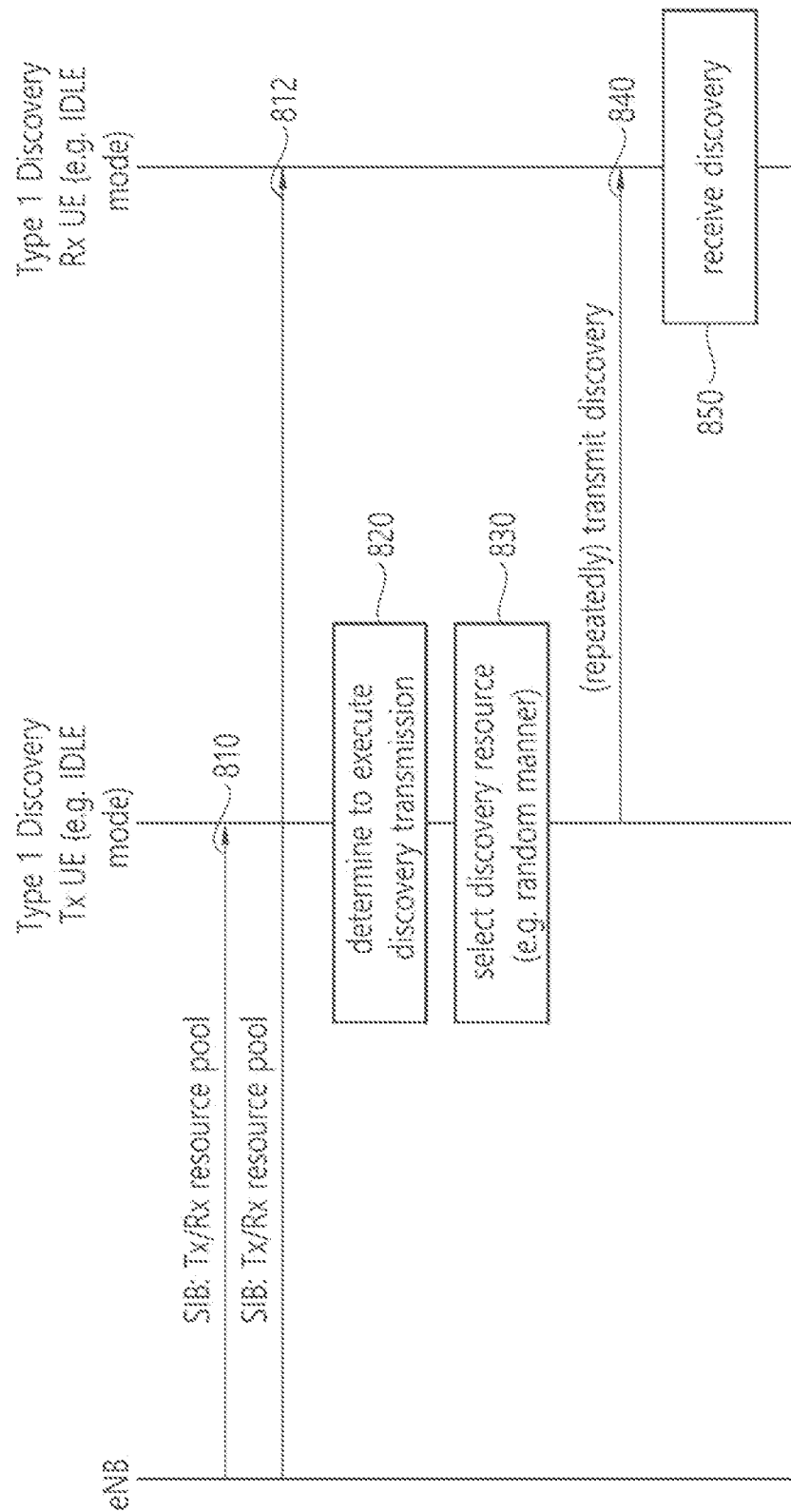
FIGS. 8 to 12 are diagrams illustrating an information delivery between UEs and eNBs for D2D communication according to the present disclosure.

FIG. 8 is a diagram illustrating a process in which an idle mode UE executes a type 1 D2D discovery transmission/reception in a wireless communication system according to the present disclosure.

Referring to FIG. 8, a Tx UE and an Rx UE obtain information associated with a TX/RX resource pool from an eNB through an SIB in operations 810 and 812. When the Tx UE and the Rx UE are in an idle mode, the eNB broadcasts SIB information so as to provide the information associated with a resource pool for D2D communication.

The Tx UE determines to execute a discovery transmission in operation 820, and selects a discovery resource of a predetermined time/frequency domain for the discovery transmission, based on the obtained information associated with the resource pool, in operation 830. The discovery resource may be selected based on a random function, and this may be identified based on identification information of the UE. The Tx UE transmits a discovery signal through the selected discovery resource in operation 840. The Rx UE receives the discovery signal in operation 850. This may be referred to as discovery type 1.

Figure 9:
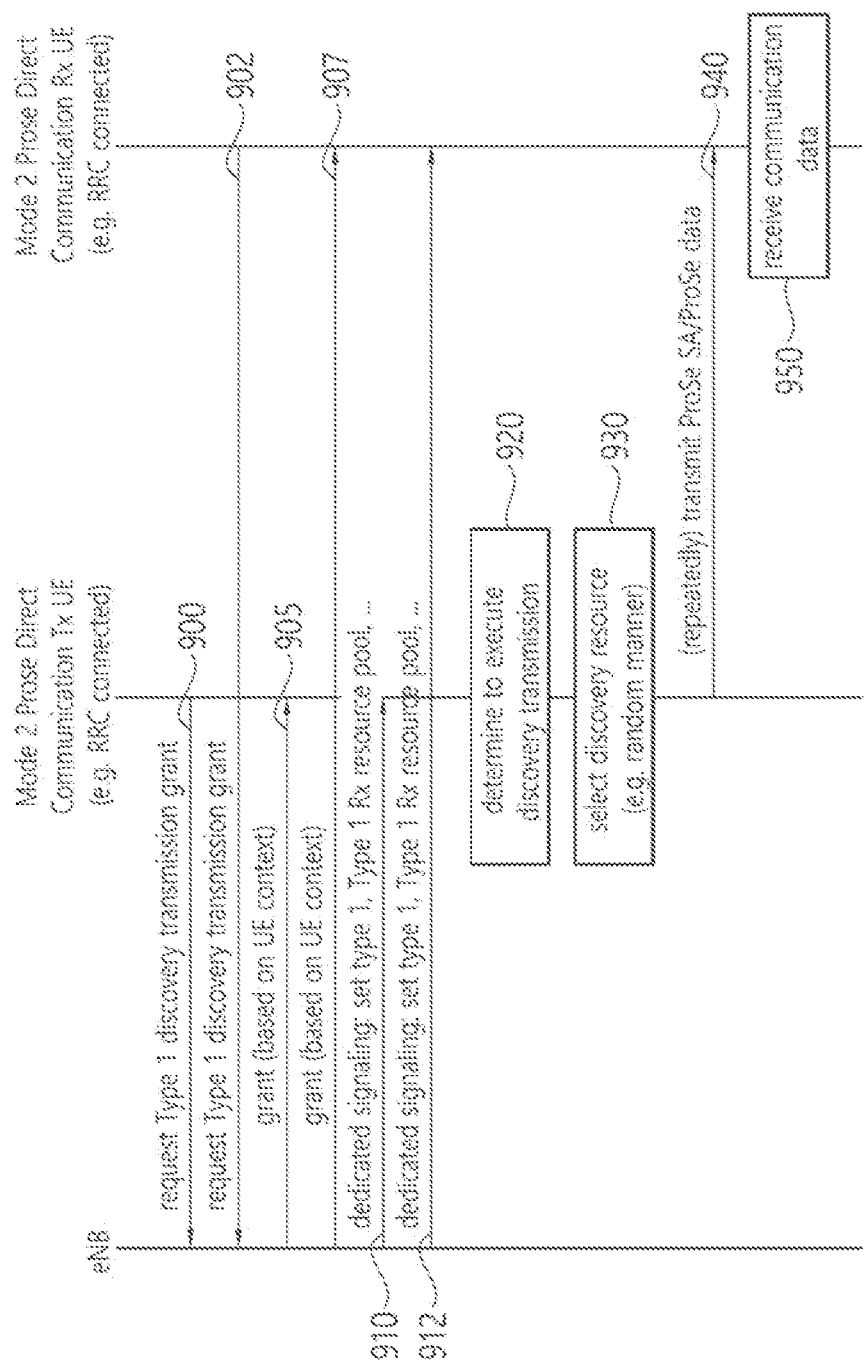

FIG. 9 is a diagram illustrating a process in which an RRC-connected mode UE executes a type 1 D2D discovery transmission/reception in a wireless communication system according to the present disclosure.

When the UE has an RRC connection, type 1 discovery may be set through a dedicated RRC signal, and an eNB may indicate corresponding resource pool information.

Referring to FIG. 9, RRC-connected mode Tx UE and Rx UE request type 1 discovery transmission grant from the eNB in operations 900 and 902. The eNB determines a discovery grant request received from each UE, and grants the request based on the context of a corresponding UE in operation 905 and 907.

In this instance, the eNB transmits configuration information associated with type 1 (i.e., information associated with a Tx/Rx resource pool and the like) through a dedicated signal to each of the RRC-connected mode Tx UE and Rx UE, in operations 910 and 912. The Tx UE and the Rx UE are in an RRC-connected mode, and the eNB may transmit, to each UE, an RRC signal in which configuration information for D2D discovery is included in RRC configuration information.

Subsequently, the Tx UE determines to execute a discovery transmission in operation 920, and selects a discovery resource of a predetermined time/frequency domain for the discovery transmission based on the obtained information associated with the resource pool in operation 930. The discovery resource may be selected based on a random function, and this may be identified based on identification information of the UE. The Tx UE transmits a discovery signal through the selected discovery resource in operation 940. The Rx UE receives the discovery signal in operation 950. Here, FIG. 9 illustrates a process in which discovery type 1 is executed.

Figure 10:
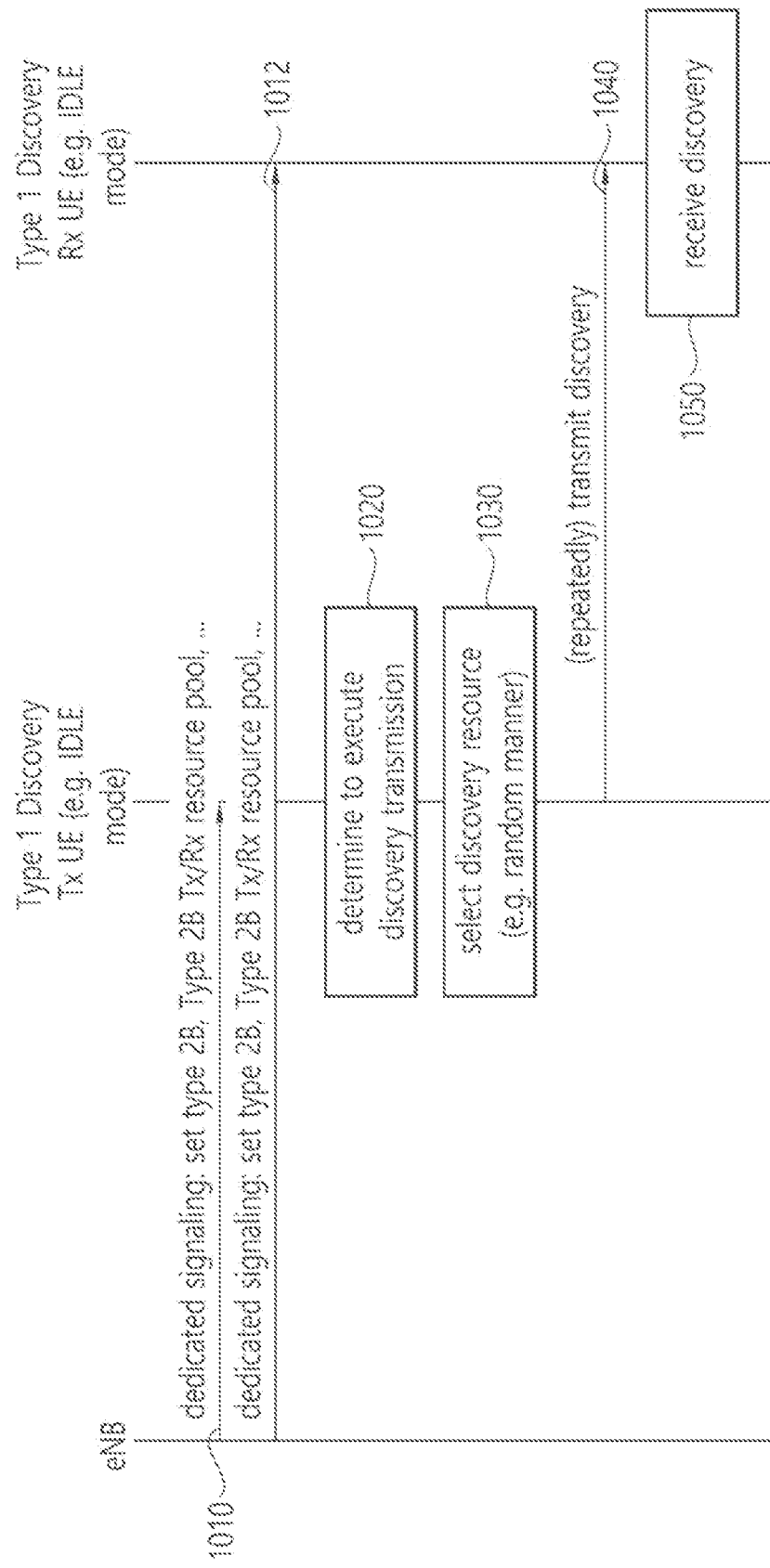

FIG. 10 is a diagram illustrating an example of transmitting or receiving type 2B D2D discovery signals in an RRC-connected mode in a wireless communication system according to the present disclosure.

Referring to FIG. 10, D2D discovery type 2B is executed in an RRC-connected mode. The D2D discovery type 2B is executed in only an RRC-connected mode.

As an example, an eNB transmits information associated with type 2 and information associated with a Tx/Rx resource pool for type 2, through a dedicated signal, to each of the RRC-connected mode Tx UE and Rx UE in operations 1010 and 1012. As a matter of course, the eNB may allow for the execution of type 2B discovery based on whether a corresponding UE is capable of executing type 2B discovery, or by request from a UE.

Accordingly, the Tx UE determines to execute a discovery transmission in operation 1020, and selects/determines a discovery resource of a predetermined time/frequency domain, which is configured through the dedicated signal in operation 1030.

Therefore, the Tx UE transmits a discovery signal through only the configured discovery resource in operation 1040. The Rx UE receives the discovery signal in operation 1050. Here, FIG. 10 illustrates a process in which type 2 discovery is executed.

Figure 11:
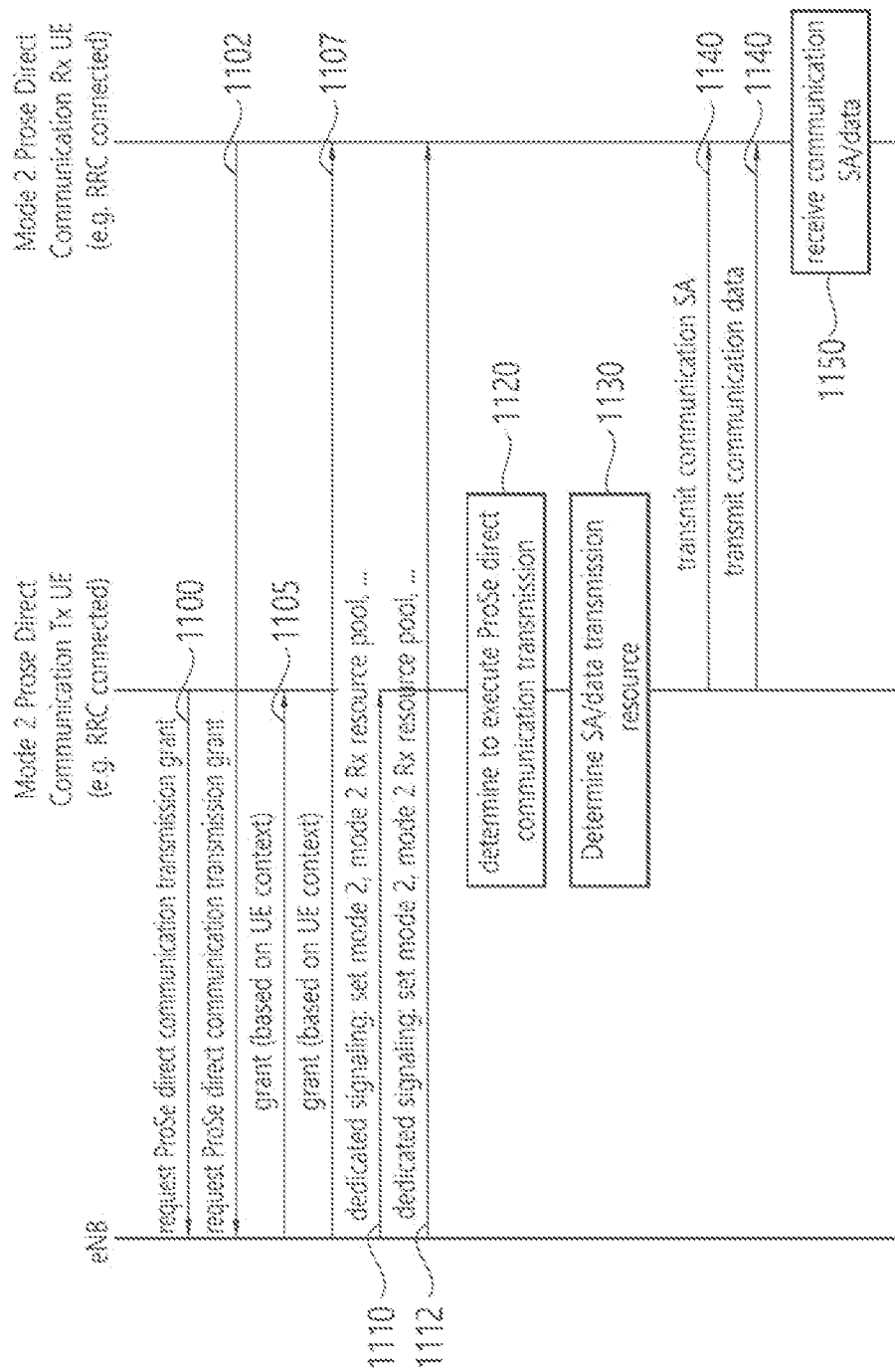

FIG. 11 is a diagram illustrating another process in which D2D data communication is executed in an RRC-connected mode in a wireless communication system according to the present disclosure.

FIG. 11 illustrates a process of executing mode 2 ProSe direct communication before executing mode 2 communication in an RRC-connected mode. As an example, the mode 2 operation may be used for an exceptional case such as RLF, and mode 1 operation may be executed by default. An idle mode UE executes the mode 2 operation based on information indicated by the SIB.

Particularly, the RRC-connected mode Tx UE and the Rx UE request a ProSe direct communication transmission grant from an eNB in operations 1100 and 1102. The eNB determines the ProSe direct communication transmission grant received from each UE, and grants the request based on the context of a corresponding UE in operations 1105 and 1107.

The eNB transmits configuration information associated with mode 2 and information associated with a Tx/Rx resource pool for mode 2, through a dedicated signal, to each of the RRC-connected mode Tx UE and Rx UE in operations 1110 and 1112. When the Tx UE and the Rx UE are in an RRC-connected mode, the eNB may transmit to each UE an RRC signal that includes information for the mode 2 D2D data communication in the RRC configuration information.

The Tx UE determines to execute a communication transmission in operation 1120, and selects/determines a resource for communication (SA/data), based on the obtained/configured resource pool information in operation 1130.

Subsequently, the Tx UE transmits communication SA/data through the selected resource, in operation 1140. The Rx UE receives the communication data in operation 1150.

Figure 12:
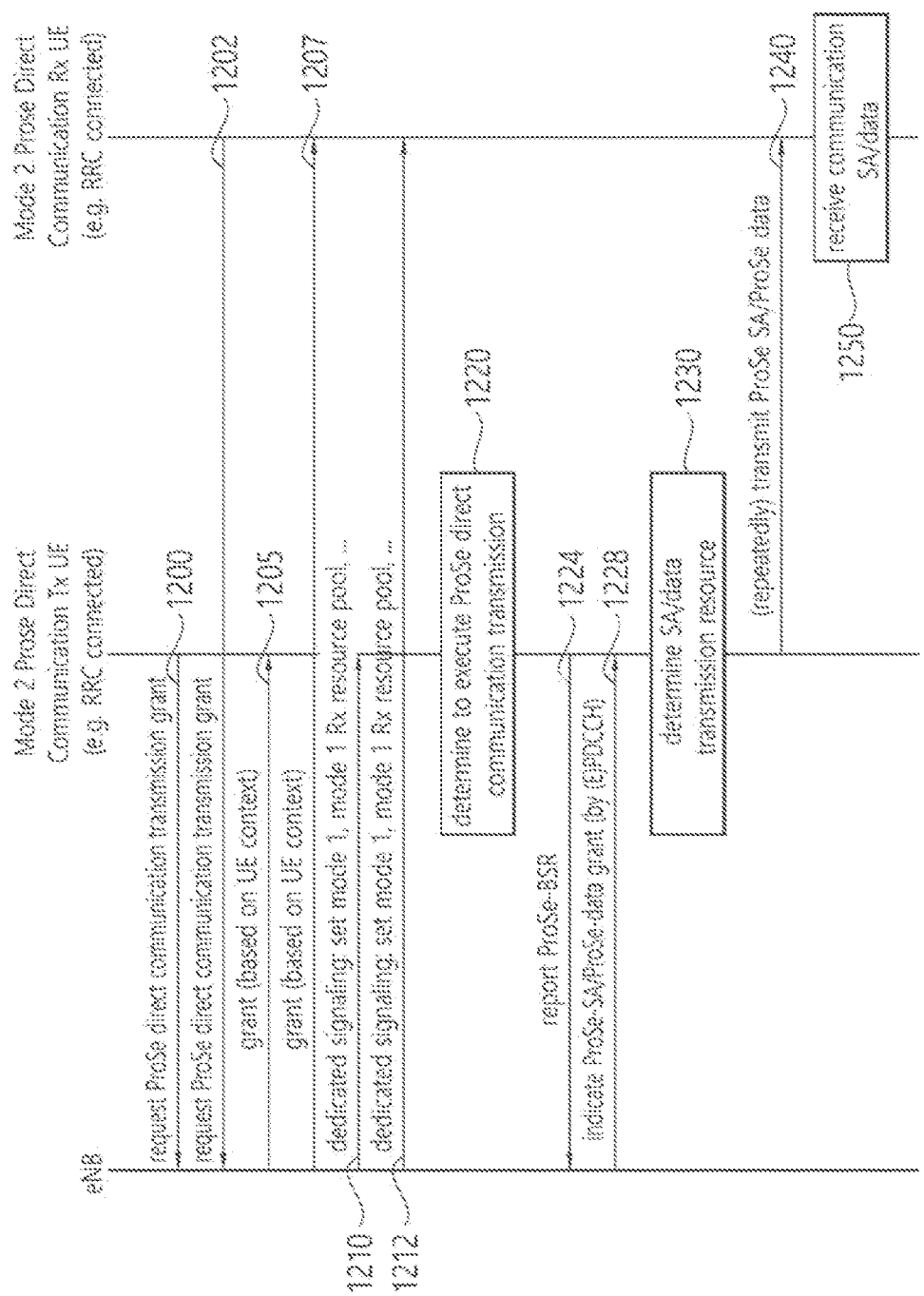

FIG. 12 is a diagram illustrating another process in which D2D discovery is transmitted/received in an RRC-connected mode in a wireless communication system according to the present disclosure.

FIG. 12 illustrates a process of executing mode 1 ProSe direct communication before executing mode 1 communication in an RRC-connected mode.

Particularly, the RRC-connected mode Tx UE and Rx UE request a ProSe direct communication transmission grant from an eNB in operations 1200 and 1202. The eNB determines the ProSe direct communication transmission grant received from each UE, and grants the request based on context of a corresponding UE in operations 1205 and 1207.

The eNB transmits configuration information associated with mode 1 and information associated with a Tx/Rx resource pool for mode 1, through a dedicated signal, to each of the RRC-connected mode Tx UE and Rx UE in operations 1210 and 1212. When the Tx UE and the Rx UE are in an RRC-connected mode, the eNB may transmit, to each UE, an RRC signal that includes information for the mode 1 D2D data communication in the RRC configuration information.

The Tx UE determines to execute a communication transmission in operation 1220, and reports a buffer state associated with the D2D data through a ProSe BSR in operation 1224. The eNB that receives the ProSe BSR from the Tx UE may allocate a ProSe SA/ProSe data grant for a D2D data transmission. The ProSe SA/ProSe data grant may be indicated through a PDCCH or an EPDCCH in operation 1228.

The Tx UE that obtains the ProSe SA/ProSe data grant selects/determines a resource for communication (SA/data) based on information associated with the configured resource pool information and the SA/data grant in operation 1230.

The Tx UE transmits ProSe SA/ProSe data (communication data) through the selected resource in operation 1240. The Rx UE receives the communication SA/data in operation 1250.

When a WAN signal transmission coexists while a service for D2D is supported, there is a need for a more effective data transmission and signal transmission/reception scheme. To this end, multiplexing of a D2D signal and a WAN signal according to the present disclosure will be described. For example, a method in which a UE having a single transceiver chain multiplexes a D2D signal and a WAN signal in an LTE FDD band will be described. Hereinafter, the methods discussed in the present disclosure may be applied to a multi-carrier scenario.

For example, the present disclosure may be applied to multiplexing of a UE that has a single transceiver chain on a cellular spectrum (carrier #0) and an uplink spectrum (on FDD) for D2D. A D2D Tx/RX signal and a WAN Tx/Rx signal may be simultaneously transferred in the FDD band. In association with multiplexing, the following four combinations are possible: 1) D2D Rx & WAN Rx, 2) D2D Rx & WAN Tx, 3) D2D Tx & WAN Tx, 4) D2D Tx & WAN Rx. Hereinafter, the four combinations will be described as Case 1 through Case 4.

<Case 1: Multiplexing D2D Rx and WAN Rx>

A case of multiplexing a D2D RX on an uplink spectrum (D2D Rx on UL spectrum) and a WAN Rx on a downlink spectrum (WAN Rx on DL spectrum) in an FDD band will be described. The following descriptions may be applied to a TDD band in a similar manner by using a subframe instead of a spectrum.

When a D2D UE is embodied to have an independent RF chain for a D2D signal and a WAN signal, the D2D UE may simultaneously receive a D2D signal and a WAN signal. Therefore, downlink carrier aggregation-capable UEs (DLCA-capable UEs) may simultaneously perform a D2D Rx on an uplink spectrum and a WAN Rx on a downlink spectrum, when downlink carrier aggregation is not configured on a WAN (e.g., LTE WAN).

By taking into consideration the RF capability of a UE and the characteristics of a D2D signal, the frequency of a D2D Tx/Rx for D2D communication may be expected to be higher than the frequency of a D2D Tx/Rx for D2D discovery. Therefore, to minimize the deterioration in WAN performance, the method may assume that a UE that is capable of performing D2D communication configures an independent RF chain for a D2D communication signal and a WAN signal, and may define detailed operations related thereto. In short, the UEs may be capable of simultaneously performing a D2D Rx and a WAN Rx in an FDD single carrier; thus it is easy to maintain a reliable radio link with respect to a WAN without affecting existing WAN signal reception.

Conversely, by taking into consideration the RF capability of a UE and the characteristics of a D2D signal, the frequency of a D2D discovery signal is expected to be lower than the frequency of a D2D communication signal. Therefore, the method may not assume that a UE that performs a D2D discovery always configures an independent RF chain for a D2D communication signal and a WAN signal, and may define operations related thereto based on the same. For example, a UE that receives a D2D discovery signal may perform a D2D Rx in the uplink and a WAN Rx in the downlink in the FDD band based on a TDM scheme, using only a single Rx chain.

To this end, the multiplexing operation performed when a D2D Tx/Rx signal and a WAN Tx/Rx signal collide will be described in association with a D2D discovery signal and a D2D communication, as follows. Hereinafter, the descriptions provided from the perspective of a D2D discovery signal may be applied equally or similarly to a D2D communication signal (or other signals).

First, FIGS. 13 to 16 are diagrams illustrating embodiments of multiplexing a D2D Rx associated with a D2D discovery signal and a WAN Rx.

Figure 13:
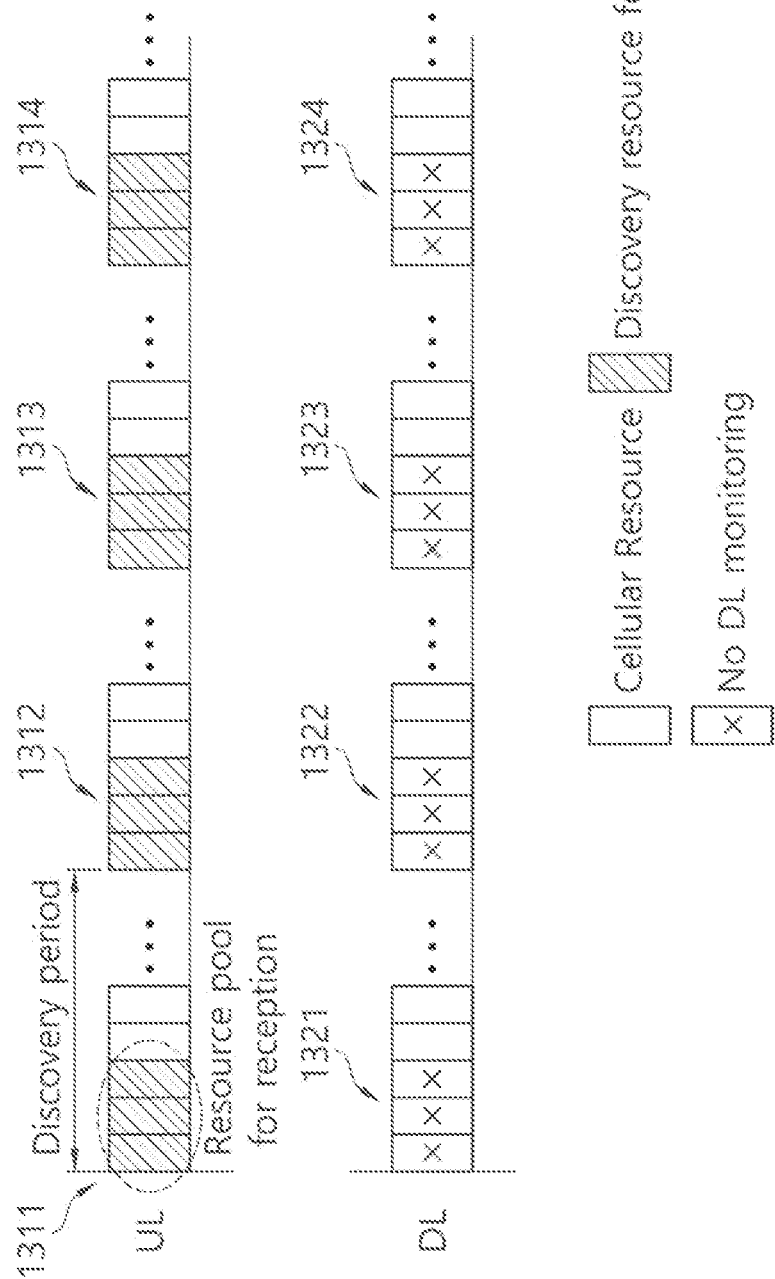
FIGS. 13 to 16 are diagrams illustrating embodiments of multiplexing a WAN Rx and a D2D Rx associated with a D2D discovery signal.

FIG. 13 illustrates an embodiment (1-1) of a method of receiving a D2D discovery signal through multiplexing of a D2D Rx and a WAN Rx according to the present disclosure.

Referring to FIG. 13, with respect to a subframe set as a resource or a resource pool 1311, 1312, 1313, and 1314 for receiving a D2D discovery signal (e.g., type 1 or type 2B) within each D2D discovery period, a D2D UE monitors (or expects) a D2D discovery signal reception on an uplink spectrum, and does not monitor (or expect) any signal on a downlink spectrum 1321, 1322, 1323, and 1324.

In this instance, an Rx D2D UE may not be accurately aware of a D2D resource through which a D2D discovery signal is to be received, and thus, the Rx D2D UE may not decode a channel (e.g., a PDCCH or ePDCCH) on a downlink spectrum with respect to a resource pool set for D2D discovery signal reception, and may monitor D2D discovery signal reception.

Figure 14:
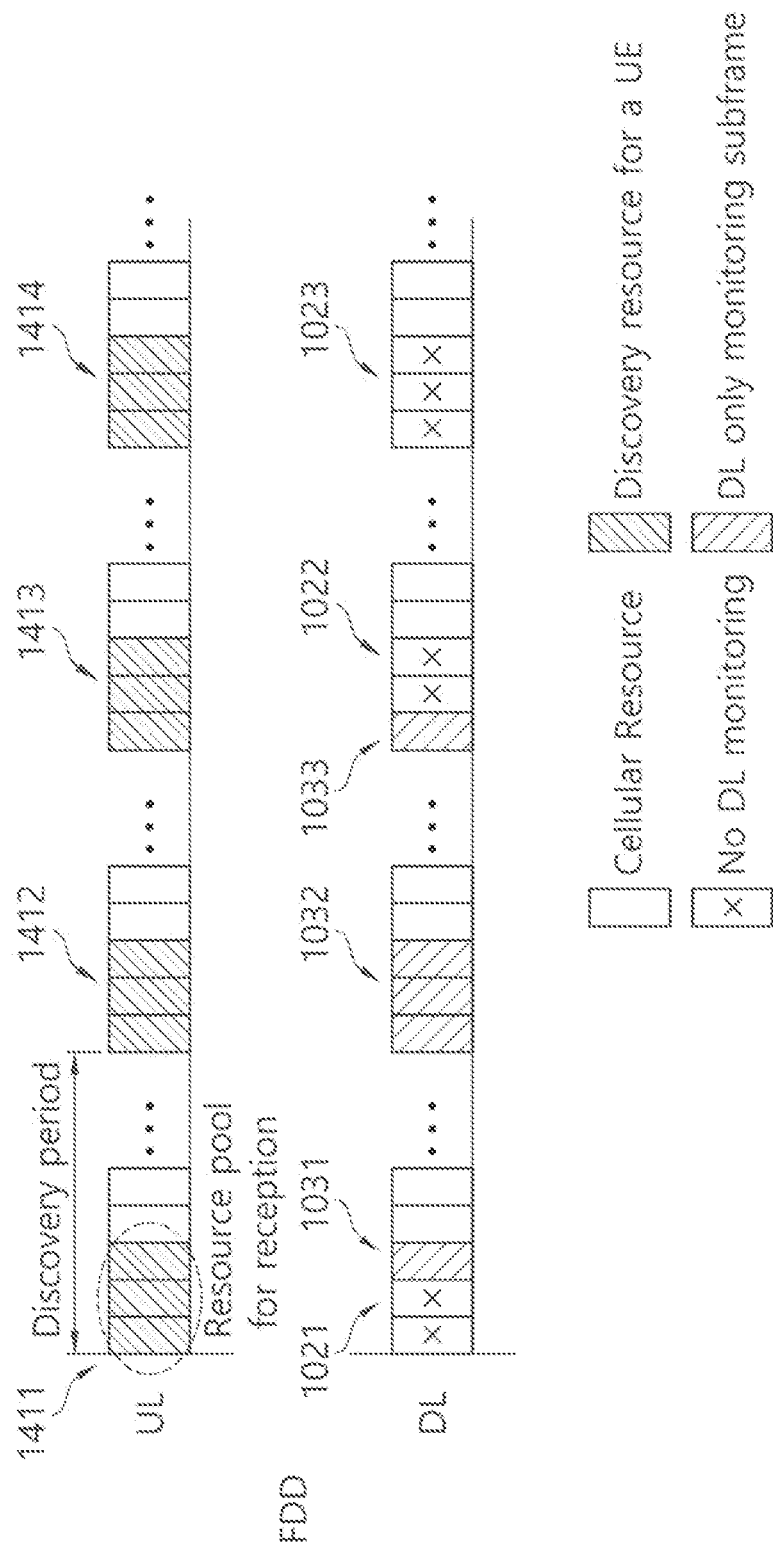

FIG. 14 illustrates another embodiment (1-2) of a method of receiving a D2D discovery signal through multiplexing of a D2D Rx and a WAN Rx according to the present disclosure.

Referring to FIG. 14, with respect to a subframe set as a resource or a resource pool 1411, 1412, 1413, and 1414 for a D2D discovery signal (e.g., type 1 or type 2B) reception within each D2D discovery period, a D2D UE monitors (or expects) a WAN signal reception on a downlink spectrum 1413, 1432, and 1433 when a subframe transferred by a serving eNB through a WAN Rx signal is at least one of the subframes 1) to 5) of Table 1 provided below.

Conversely, when a subframe transferred by the serving eNB through a WAN Rx signal is different from the subframes 1) to 5) of Table 1, the D2D UE monitors (or expects) a D2D discovery signal reception on an uplink spectrum and does not monitor (or expect) any signal on a downlink spectrum 1421, 1422, and 1423.

TABLE 1

1) a subframe that requests or requires monitoring for reception of a channel (e.g., a PDCCH or ePDCCH) with respect to at least one of these: System Information (SI), Paging, Random Access Response (RAR), Transmission Power Control (TPC), or MCCH change modification
2) a subframe through which a PBCH, a PSS, or an SSS is transmitted
3) a subframe in which a measurement gap is configured for measuring the channel quality of an inter-carrier/inter-RAT
4) a subframe in which a UE wakes up for a downlink reception (DL Rx) when the UE performs a discontinuous reception (DRX) operation (e.g., a subframe indicated by long/short DRX cycle, a subframe before a timer expires, or the like)
5) an MBSFN subframe or a subframe for PMCH monitoring when a UE is capable of receiving an MBMS service (enabled)

Referring to Table 1, multiplexing of FIG. 10 may not be applied (that is, multiplexing may be selectively applied) with respect to the DRX operation of the UE of 4).

According to the multiplexing method of FIG. 14, a D2D UE may receive signals for maintaining a link with a WAN and for effectively responding to a predetermined service (e.g., MBMS). Monitoring only reception by a UE of the signals listed in Table 1 is allowed even in a D2D discovery resource pool. Through the above, the method may perform a D2D discovery and, at the same time, may minimize the effect on changing of important system information of a WAN, maintaining an uplink access, power control, an MBMS service, synchronization, channel measurement, and the like.

As another example, with respect to a subframe that requires monitoring for reception of at least one channel (e.g., a PDCCH or ePDCCH) that is scrambled to System Information (SI)/Paging (P)/Random Access (RA)/Transmission Power Control (TPC)/Multimedia Broadcast (M)/Multicast Service (MBMS)-RNTI, and is detected from a common search space (CSS), a D2D UE may monitor a corresponding channel (e.g., a PDCCH or an ePDCCH) on a downlink spectrum even in a D2D discovery resource, and may decode the same.

Figure 15:
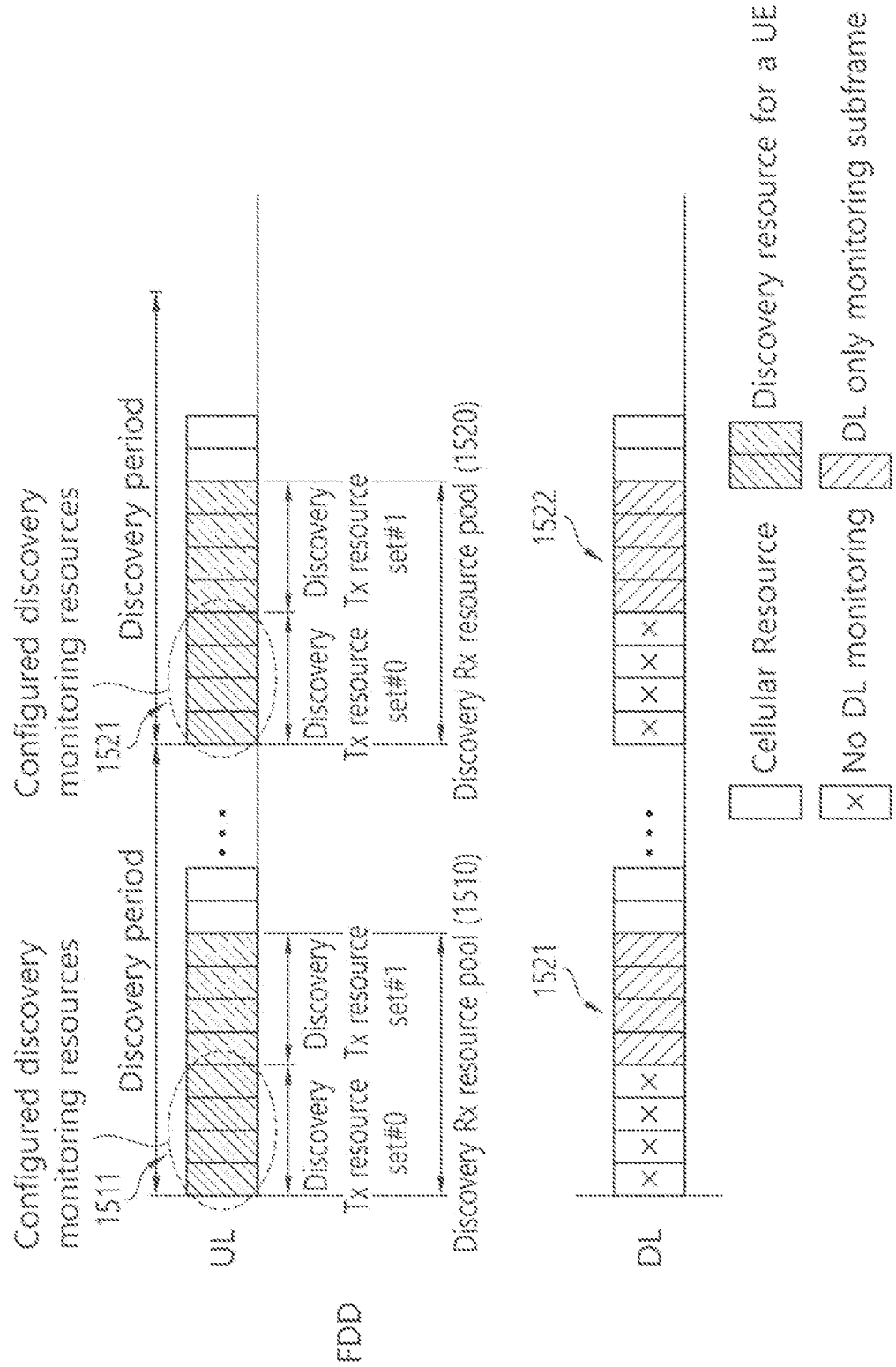

FIG. 15 illustrates another embodiment (1-3) of a method of receiving a D2D discovery signal through multiplexing of a D2D Rx and a WAN Rx according to the present disclosure.

Referring to FIG. 15, a D2D UE monitors D2D discovery signal reception in only a few resources 1511 and 1521 in subframes 1510 and 1520, which are set as a resource pool for receiving a D2D discovery signal (e.g., type 1 or type 2B). The resources are referred to as configured discovery monitoring resources.

In this instance, a D2D UE always monitors (or expects) a D2D discovery signal reception on an uplink spectrum in only a corresponding resource 1511 or 1521, and monitors (or expects) reception of a WAN signal 1521 or 1522 on a downlink spectrum with respect to the remaining D2D discovery resources.

Particularly, the method of FIG. 11 may be more useful to the D2D discovery type 2B since the first resource in a resource set configured in a network (NW) may be a subframe.

The multiplexing method of FIG. 15 may solve a latency problem associated with the reception of a D2D discovery signal and, at the same time, may minimize the deterioration in performance and maintenance associated with a WAN link.

Also, the multiplexing method in FIG. 15 may configure a monitoring resource for a D2D discovery reception to be a subset smaller than or equaling a D2D discovery resource pool, and may use D2D discovery resources for purposes other than the reception of a D2D discovery signal. A D2D UE may not receive a D2D discovery signal transmitted from a predetermined D2D discovery Tx UE group according to the control of an eNB.

For example, a D2D discovery resource pool may be transferred to all D2D discovery UEs in a cell through an SIB inside network (NW) coverage. However, in many cases, an Rx D2D UE may not need to monitor all D2D discovery resources. Therefore, the Rx D2D UE may perform monitoring with respect to a subset of resources configured according to an RRC signal. Through the above, from the perspective of an Rx D2D UE, the method may increase efficiency of the Rx D2D UE and may minimize the effects on WAN downlink reception.

Figure 16:
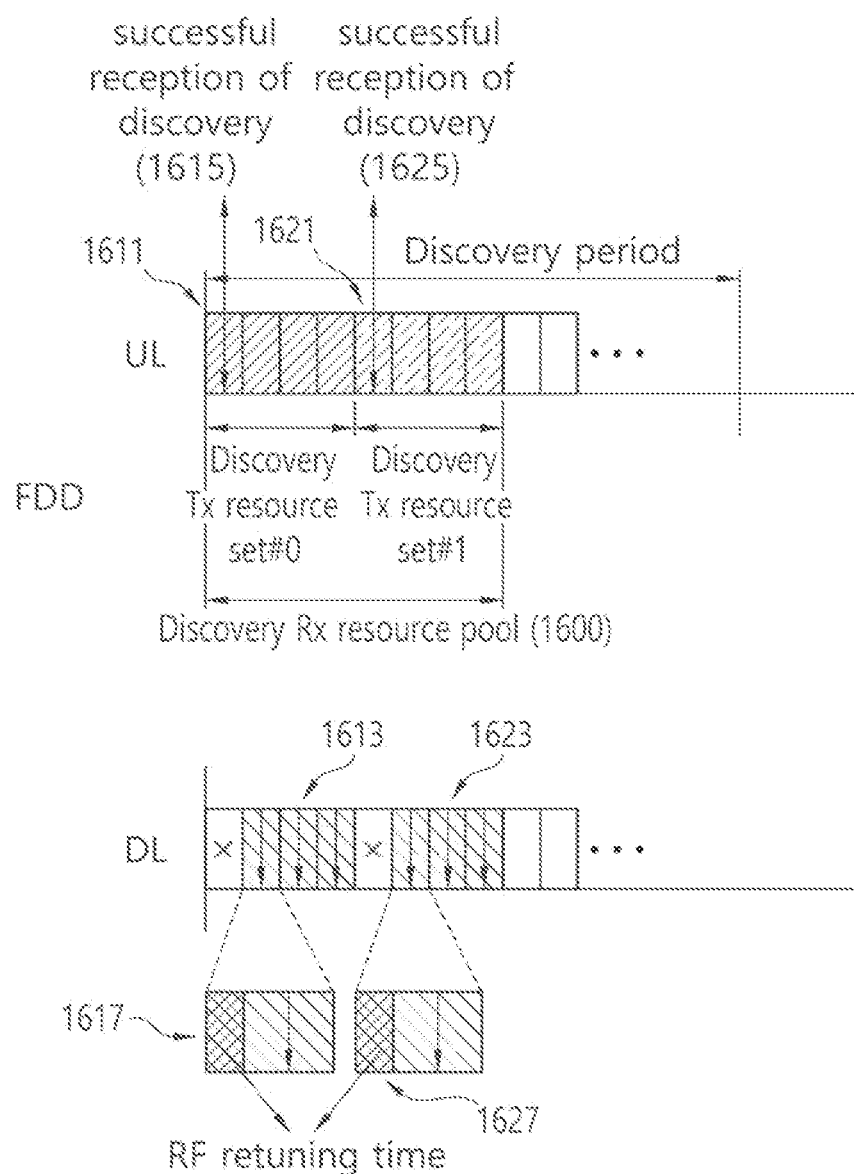

FIG. 16 illustrates another embodiment (1-4) of a method for receiving a D2D discovery signal through multiplexing of a D2D Rx and a WAN Rx according to the present disclosure.

Referring to FIG. 16, a D2D UE monitors (expects) a D2D discovery reception on an uplink spectrum until the D2D UE receives a D2D discovery signal in a first D2D discovery resource 1611 and 1621 from among subframes 1600 configured as a resource pool for a D2D discovery reception (e.g., type 1 or type 2B), and successfully receives or decodes an MAC PDU of the corresponding D2D discovery signal as shown in the diagrams 1615 and 1625. In this instance, the first D2D discovery resource may be a first resource for a D2D discovery transmission resource set. Therefore, when the D2D UE accurately decodes and receives the D2D discovery signal in the first D2D discovery resource from among the subframes configured as a resource pool for a D2D discovery (type 1 or type 2B) reception, the D2D UE monitors (expects) reception of a WAN downlink signal on a downlink spectrum in the remaining resources 1613 and 1623 after excluding the first D2D discovery resource from the D2D discovery resource set.

Figure 17:
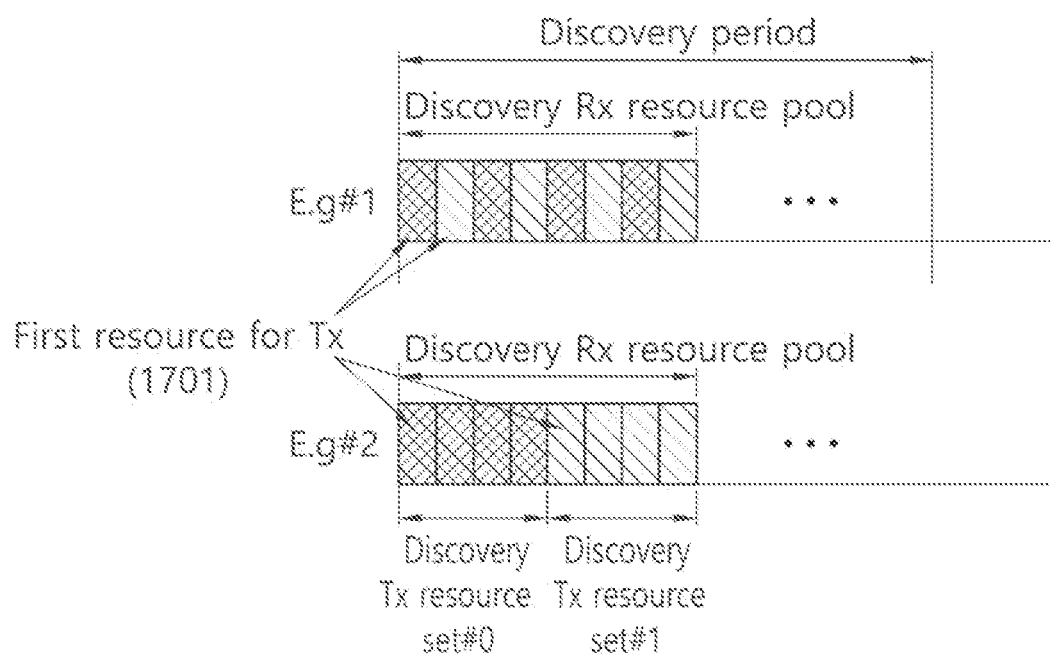
FIGS. 17 and 18 are diagrams illustrating examples of applying multiplexing of a D2D Rx and a WAN Rx to a plurality of discovery resources according to the present disclosure.
Figure 18:
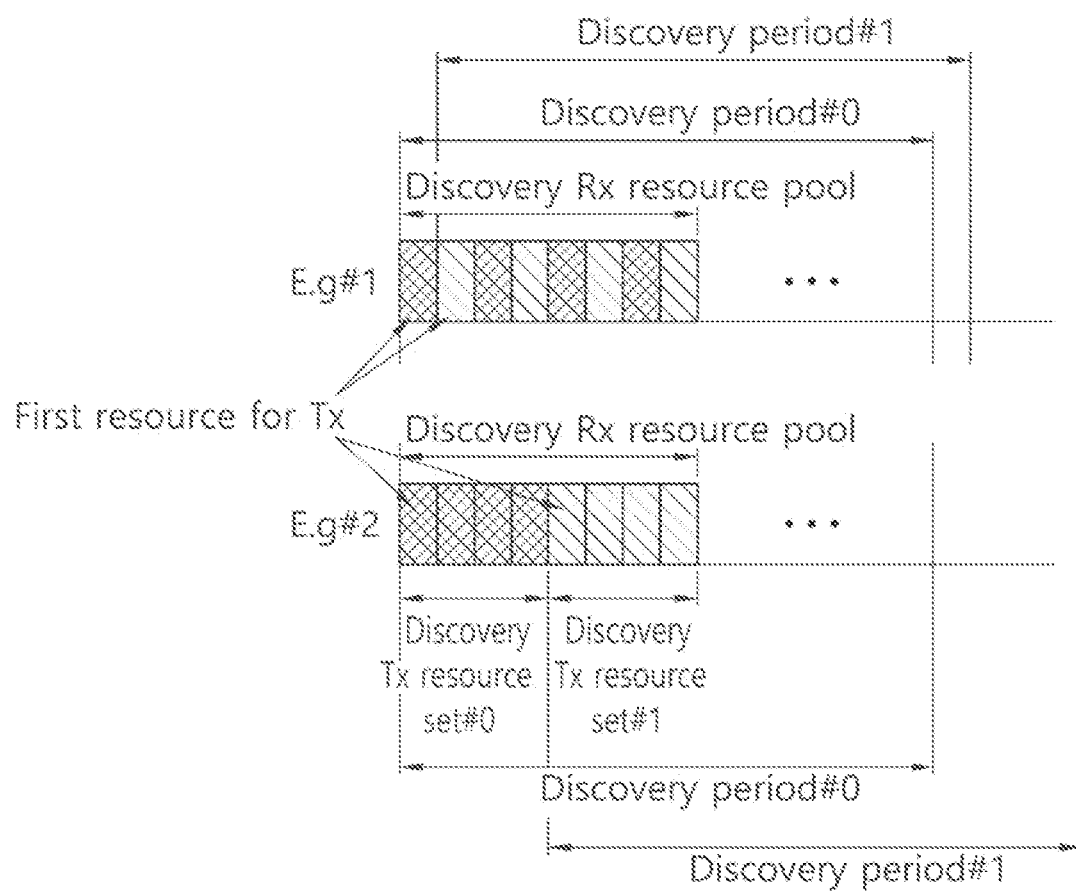

FIGS. 17 and 18 are diagrams illustrating examples of applying multiplexing of a D2D Rx and a WAN Rx to a plurality of discovery resources according to the present disclosure.

Referring to FIG. 17, because a resource 1701 (e.g., a subframe) on the time domain of a first resource for Tx/Rx in a single discovery period of a cell is known (by specification with deterministic resources for retransmission of discovery), a D2D UE monitors (expects) D2D discovery reception in the corresponding first resource, determines whether to monitor the remaining resources (deterministic resources for retransmission) based on whether D2D discovery reception is successfully performed, and determines whether to receive a WAN downlink signal on a downlink spectrum.

Referring to FIG. 18, the embodiment of FIG. 17 may be extended to the case in which multiple different resource periods are configured in a cell.

Referring again to FIG. 16, when a D2D discovery reception is successfully performed in the first resource, a next resource may include an RF retuning time 1617 and 1627 of at least several µs to ms. A single gap may be defined for the abovementioned time, which may be generated through rate matching or puncturing.

A D2D UE receives a D2D discovery until a corresponding D2D discovery MAC PDU is successfully received (or decoded) in the first D2D discovery resource or in a subframe in which the remaining repeated transmissions are expected to be performed. This process increases the probability of successfully receiving a D2D discovery MAC PDU in a single D2D discovery period, and thus increases the probability of effectively utilizing a resource.

In this instance, a single D2D discovery Rx UE may increase the probability of successful discovery reception during a given discovery period and may thus decrease latency in a D2D discovery.

Second, embodiments of multiplexing a D2D Rx and a WAN Rx in association with a D2D communication signal will be described.

When a basic RF capability of a D2D UE is assumed to be a single transceiver chain with respect to a D2D communication signal (e.g., SA in mode 1/2, or when a UE that is capable of simultaneously performing a WAN Rx in the downlink and a D2D RX in the uplink in association with D2D communication is assumed), additional multiplexing methods of the following embodiments may be applied. Particularly, different considerations associated with the SA may be applied to an SA resource pool, when compared to the embodiments of the D2D discovery.

According to one embodiment (1-5), a D2D UE always monitors (or expects) reception of a communication signal on an uplink spectrum in the subframes of a resource pool for reception of a D2D communication signal (e.g., SA in mode 1/2). Therefore, the D2D UE does not monitor (or expect) reception of a communication signal on a downlink spectrum in the subframes of the corresponding reception resource pool. This instance may minimize latency of successful decoding of a D2D communication signal.

According to another embodiment (1-6), when information that a corresponding serving eNB transfers through a WAN Rx on a downlink spectrum, with respect to the subframes in a resource pool for receiving a D2D communication signal (e.g., SA in mode 1/2), is at least one of the subframes 1) to 4) of Table 2 provided below, a UE monitors (or expects) reception on the downlink spectrum, and performs a related operation. Otherwise, the UE monitors (or expects) reception of a D2D communication signal (e.g., SA in mode 1/2) in the subframes in a communication signal reception resource pool.

TABLE 2

1) a subframe that requests or requires monitoring for receiving a channel (e.g., a PDCCH or ePDCCH) associated with at least one of SI/paging/RAR/TPC/MCCH change modifications
2) a subframe through which a PBCH/PSS/SSS is transmitted
3) a subframe in which a measurement gap for measuring the channel quality of an inter-carrier/inter-RAT
4) a subframe in which a UE wakes up for a downlink reception (DL Rx) when the UE performs a discontinuous reception (DRX) operation (e.g., a subframe indicated by long/short DRX cycle, a subframe before an activity timer expires, or the like)

Referring to FIG. 16, for reception between a downlink spectrum and an uplink spectrum (TDM with RF switching), a time 1617 and 1627 for RF retuning may be needed between two spectrums of a single transceiver chain. In this instance, a time gap may be proposed for providing a time for RF retuning.

<Case 2: Multiplexing D2D Rx and WAN Tx>

It will be described that multiplexing is performed in order to transfer a D2D Rx and a WAN Rx on an uplink spectrum.

Figure 19:
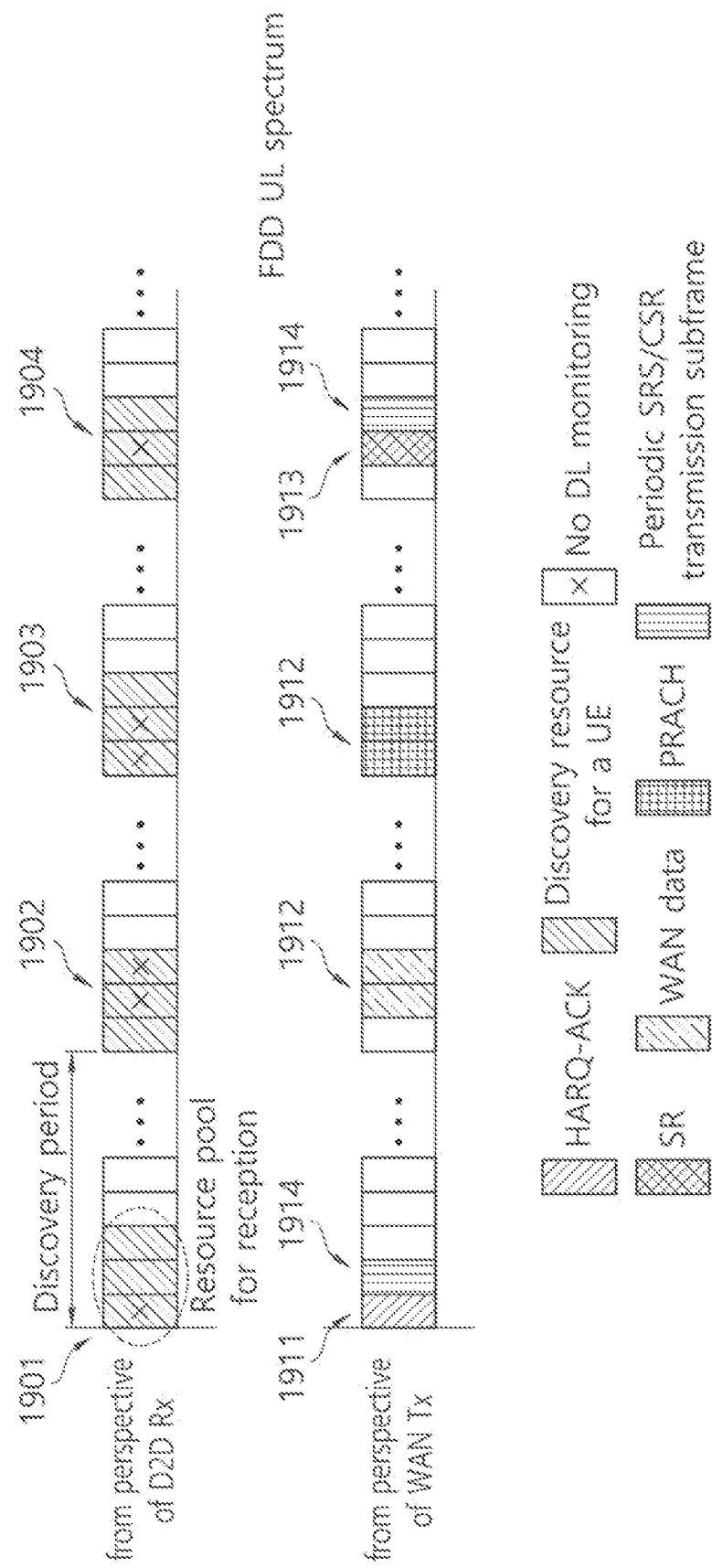
FIG. 19 is a diagram illustrating an example (2-1) of multiplexing a D2D Rx and a WAN Tx on an uplink spectrum according to the present disclosure.
Figure 20:
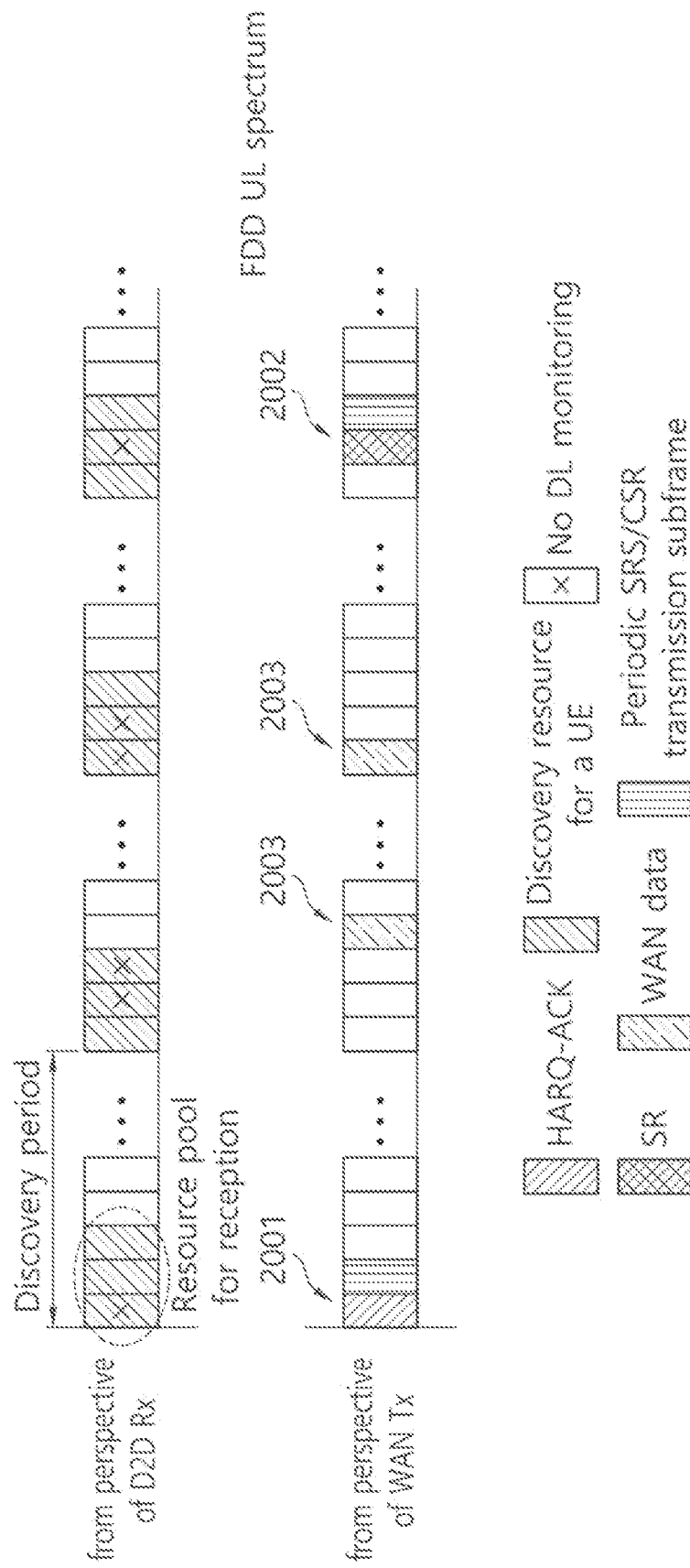
FIG. 20 is a diagram illustrating another example (2-2) of multiplexing a D2D Rx and a WAN Tx on an uplink spectrum according to the present disclosure.
Figure 21:
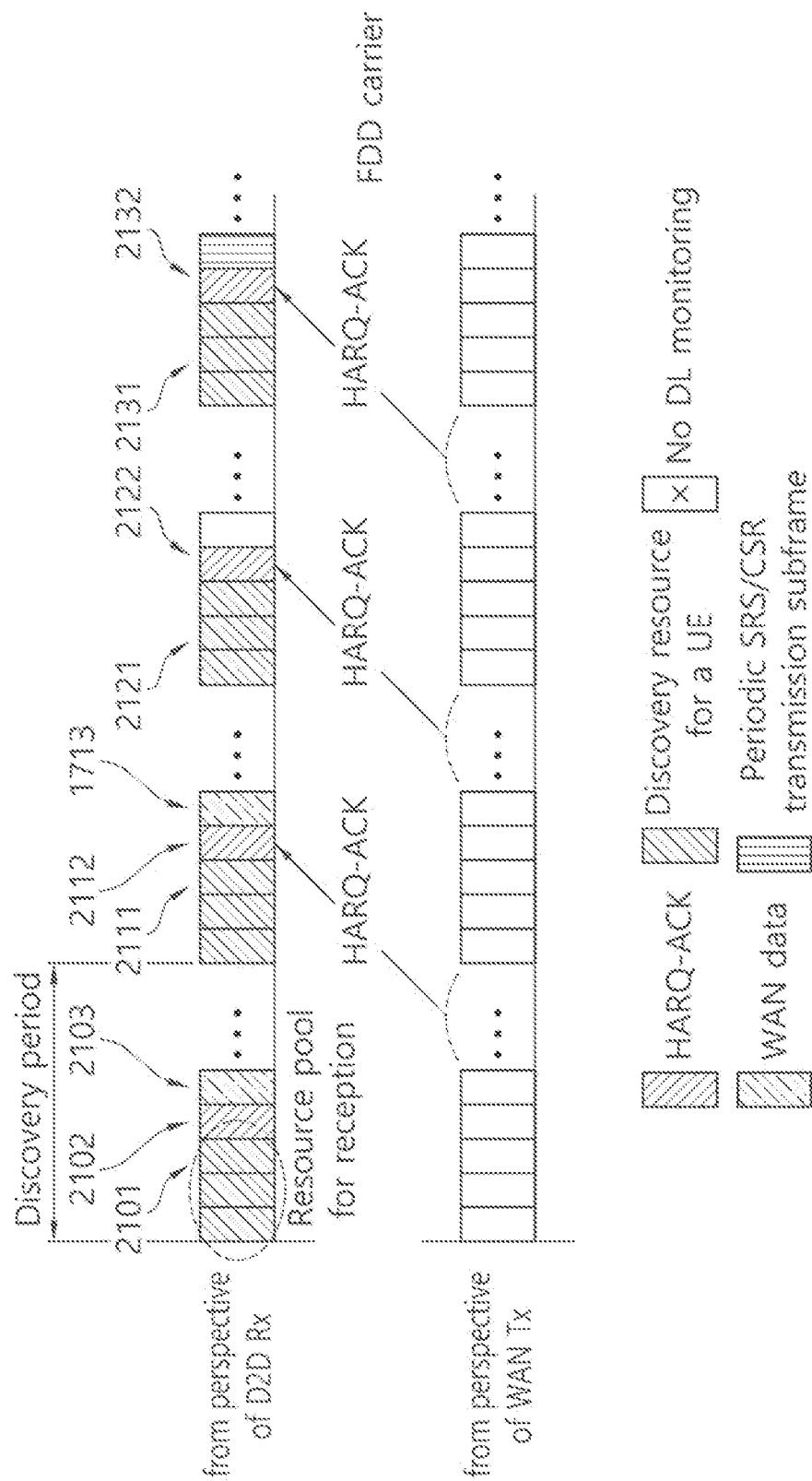
FIG. 21 is a diagram illustrating another example (2-3) of multiplexing a D2D Rx and a WAN Tx on an uplink spectrum according to the present disclosure.

Irrespective of the RF capability (e.g., single/double transceiver chain) of a UE, it is not allowed to simultaneously perform a D2D Rx and a WAN Tx (e.g., full duplex D2D Rx/WAN Tx) in a single uplink spectrum/subframe (e.g., FDD/TDD). Therefore, the embodiments of FIGS. 19 to 21 are proposed to avoid a collision between a D2D Rx and a WAN Tx. The embodiments may be applied to only a single D2D signal (e.g., a D2D communication signal [mode 1/2]), a D2D discovery signal (type 1/2), or a synchronization signal (D2DSS or PD2DSCH). The embodiments may also be applied to only some D2D signals, or may be applied to only a predetermined mode or type.

FIG. 19 is a diagram illustrating an example (2-1) of multiplexing a D2D Rx and a WAN Tx on an uplink spectrum according to the present disclosure.

Referring to FIG. 19, when transmission of a WAN uplink signal is scheduled or configured in advance in a resource pool for reception of a D2D signal (e.g., a D2D discovery signal [type 1 or type 2] or a D2D communication signal [SA, mode 1/2]) or resources for reception 1901, 1902, 1903, and 1904 in a resource pool, a WAN uplink signal is preferentially transmitted, and monitoring (or decoding) of reception of a D2D signal is not performed. For example, a WAN uplink signal that is transmitted in preference to monitoring of a D2D signal may include a HARQ-ACK 1911, a PRACH 1912, an aperiodic SRS/CSI, an SR 1913, or the like. Through the above, deterioration in WAN performance may be minimized.

More particularly, an embodiment will be described in which a WAN uplink signal that is scheduled in advance is preferentially transmitted to a D2D UE, and monitoring (or decoding) of a D2D reception signal is not performed.

An example (2-1-1) corresponds to the remaining cases, excluding the case in which an SRS or a CSI (e.g., a periodic CSI and/or an aperiodic CSI) from among WAN uplink signals is transmitted in a resource pool for receiving a D2D signal or is transmitted in the resources in a resource pool (e.g., a D2D discovery resource pool, resources for reception in a resource pool, a resource pool for receiving a D2D communication signal [SA, Mode 1/2], or resources for reception in a resource pool). That is, only when an SRS or a CSI from among WAN uplink signals is transmitted in a D2D reception resource pool/configured resources, a D2D UE monitors (or decodes) reception of a D2D signal, and may drop the SRS or the CSI, which is the corresponding WAN uplink transmission signal.

According to another example (2-1-2), when transmission of an aperiodic SRS or aperiodic CSI is performed at the same time as monitoring of reception of a D2D signal in the same uplink subframe, the aperiodic SRS or the aperiodic CSI is transmitted and monitoring (or decoding) of the reception of the D2D signal may be skipped. In this instance, when transmission of a periodic SRS or a periodic CSI 1914 is performed at the same time as monitoring of reception of a D2D signal in the same uplink subframe, the monitoring (or decoding) of the reception of the D2D signal is performed and the transmission of the periodic SRS or the periodic CSI may be dropped.

According to another example (2-1-3), when the CSI reporting type corresponds to at least one of "3, 5, 6, and 2a", the corresponding CSI report is performed and monitoring (or decoding) of the reception of a D2D signal may be dropped. That is, in a D2D resource, a WAN uplink transmission associated with CSI reporting of type 3, 5, 6, or 2a may be prioritized over the reception of a D2D signal. However, for other CSI reporting types, reception of a D2D signal is preferentially performed.

FIG. 20 is a diagram illustrating an example (2-2) of multiplexing a D2D Rx and a WAN Tx on an uplink spectrum according to the present disclosure.

Referring to FIG. 20, when a WAN uplink signal associated with a PUCCH or PUSCH (or PUSCH retransmission) and including at least one piece of control information is scheduled (or configured) in a resource pool for receiving a D2D discovery (type 1/2), a D2D communication (SA, Mode 1/2) signal, or resources for reception in a resource pool, a WAN uplink signal is preferentially transmitted. In this instance the process skips monitoring (or decoding) reception of a D2D signal.

The PUCCH or PUSCH including the control information may be, for example, a PUCCH or a PUSCH including at least one of: a PRACH, a HARQ-ACK 2001, an SR 2002 (or BSR), a message responsive to an RAR message (e.g., message 3), or Data (PUSCH) retransmissions 2003. In this instance, reception of a WAN uplink signal associated with a PUCCH or a PUSCH for purposes other than corresponding control information may be skipped, and D2D signal reception may be monitored (or decoded) in the corresponding D2D resource pool or in configured resources.

Through the above, a WAN uplink transmission that transfers the main control information may be secured in preference to a D2D signal.

FIG. 21 is a diagram illustrating another example (2-3) of multiplexing a D2D Rx and a WAN Tx on an uplink spectrum according to the present disclosure.

Referring to FIG. 21, one of the DL-reference UL/DL configurations (e.g., Table 3) defined as a downlink HARQ timing for an FDD secondary serving cell in "TDD-FDD TDD (PCell)-FDD(SCell) CA in self-scheduling" is configured through higher layer scheduling in a resource pool for receiving a D2D discovery (e.g., type 1/2), D2D communication (e.g., SA, mode 1/2), or resources for reception in a resource pool. Through the above, the effect of a HARQ-ACK transmission associated with a downlink PDSCH transmission among WAN uplink transmission signals may be minimized. An eNB appropriately schedules (configures) a transmission resource and may enable data (e.g., PUSCH) and a signal (e.g., a CSI, SRS, SR, PRACH, or the like) to be transmitted in resources excluding a D2D resource.

In FIG. 21, a DL-reference HARQ configuration indicates that a HARQ-ACK 2102, 2112, 2122, and 2132 is transferred after a D2D reception resource pool 2101, 2111, 2121, and 2131. WAN data 2103 and 2113 and an SRS/CSI transmission frame 2143 are transmitted, respectively, after the HARQ-ACK 2102, 2112, 2122, and 2132.

Table 3 illustrates the downlink association set index (K:$\{k_0, k_1, \ldots, k_{M-1}\}$) associated with an FDD-TDD and serving cell frame structure type 1.

TABLE 3

| DL reference UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, 5 | 5, 4 | 4 | — | — | 6, 5 | 5, 4 | 4 |
| 1 | — | — | 7, 6 | 6, 5, 4 | — | — | — | 7, 6 | 6, 5, 4 | — |
| 2 | — | — | 8, 7, 6, 5, 4 | — | — | — | — | 8, 7, 6, 5, 4 | — | — |
| 3 | — | — | 11, 10, 9, 8, 7, 6 | 6, 5 | 5, 4 | — | — | — | — | — |
| 4 | — | — | 12, 11, 10, 9, 8, 7 | 7, 6, 5, 4 | — | — | — | — | — | — |

TABLE 3-continued

| DL reference UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 5 | — | — | 13, 12, 11, 10, 9, 8, 7, 6, 5, 4 | — | — | — | — | — | — | — |
| 6 | — | — | 8, 7 | 7, 6 | 6, 5 | — | — | 7 | 7, 6, 5 | — |

Referring to Table 3, n denotes a subframe number. The downlink subframe set associated with a subframe having the corresponding number is determined by K={k0, k1, . . . , kM−1}. n−k indicates a subframe index of the subframe located k subframes before an $n^{th}$ subframe, which indicates the downlink subframe associated with a current subframe. An associated downlink subframe indicates a subframe that carries a PDSCH used for determining an ACK/NACK signal, or that carries a PDCCH indicating a DL SPS release. M denotes the number of elements in the set K defined in Table 3, and indicates the number of downlink subframes associated with the $n^{th}$ subframe.

For example, when a DL-reference UL/DL configuration corresponding to a single serving cell is "1", M=2 is associated with a downlink association set K for subframe #2, k0=7, and k1=6. Therefore, downlink subframes associated with the subframe #2 of the corresponding serving cell are the subframe #5 (2−k0) and subframe #6 (2−k1) of a previous radio frame. Also, for example, when the DL reference UL/DL configuration is "2", the subframe numbers associated with subframe #2 may be 8, 7, 6, 5, and 4, and the subframe numbers associated with subframe #7 may also be 8, 7, 6, 5, and 4.

According to an example (2-3-1), a higher layer signal may be configured in a DL-reference UL-DL configuration sub-set including some of the seven DL-reference UL/DL configurations of Table 3, as opposed to being configured to support all of the seven DL-reference UL/DL configurations. In this instance, the DL-reference UL-DL configuration sub-set may be configured to always include DL-reference UL-DL configuration #5.

For example, an eNB may select one of the DL reference UL-DL configurations #2, #4, and #5 from a higher layer signal configured in a DL-reference UL-DL configuration sub-set including the DL reference UL-DL configurations #2, #4, or #5. The selected DL reference will result in a relatively low-frequency HARQ-ACK transmission, and may set the selected DL-reference UL-DL configuration for D2D UEs.

According to another example (2-3-2), when it is inevitable that a limited WAN signal transmission and a D2D signal reception are performed (that is, when they collide) in the same resource even though the method of FIG. 21 is used, an eNB and a UE may always perform a WAN signal transmission first. For example, an uplink resource environment is limited due to "TDD, a limited system BW, or a WAN uplink SPS transmission" or the like, and thus, when a WAN signal transmission and a D2D signal reception collide, an eNB and a UE may always perform a WAN signal transmission first.

The method in FIG. 21 relies on the fact that a HARQ-ACK transmission operated in an FDD band may be performed in all uplink subframes (e.g., a subframe n) based on scheduling on a downlink subframe (e.g., subframe n−4). A HARQ-ACK transmission in a D2D resource may be avoided through scheduling constraints, such as uplink data scheduling, but this may cause deterioration in WAN downlink performance, which is a drawback.

Therefore, the method of FIG. 21 may avoid the collision between a HARQ-ACK transmission and a D2D resource, and at the same time may apply a downlink HARQ timing (DL HARQ timing) introduced in a TDD-FDD CA, thereby becoming capable of performing data scheduling in all FDD downlink subframes.

According to another example (2-4), when a collision with a WAN uplink transmission occurs in a resource pool for receiving a D2D discovery (type 1/2) signal or resources for reception in a resource pool, a D2D UE always receives a D2D discovery signal (or receives only a type 1 D2D discovery signal). When a collision with a WAN uplink transmission occurs in a resource pool for receiving a D2D communication (SA) signal or resources for reception in a resource pool, a D2D UE always transmits a WAN uplink signal.

<Case 3: Multiplexing D2D Tx and WAN Tx>

A D2D Tx and a WAN Tx may not be simultaneously transmitted on a single carrier (e.g., on an uplink spectrum of an FDD carrier). That is, FDM is not allowed and only TDM is allowed.

Similar to Case 2, a D2D UE may perform only one of a D2D signal transmission or a WAN signal transmission (but may not be capable of performing the remaining one).

Unlike Case 2, a D2D discovery or communication transmission resource needs to be considered.

Particularly, D2D discovery type 1 defines an operation when a collision with a WAN transmission signal occurs in a D2D discovery resource set utilized for transmitting (or retransmitting) a D2D discovery signal (that is, when a D2D discovery signal transmission and a WAN signal transmission are simultaneously performed). A resource for transmission of D2D discovery signal type 1 is randomly selected by a Tx UE, and an eNB may not have information about whether the corresponding resource is to be used by the Tx D2D UE.

Conversely, D2D discovery type 2B corresponds to the case in which a collision with a WAN signal transmission occurs in a D2D discovery resource indicated by an eNB. In D2D discovery type 2B, unlike in D2D discovery type 1, an eNB controls the utilization of resources; thus, a collision between a D2D discovery signal transmission and a WAN transmission signal may be avoided according to scheduling or configuration by the eNB.

Hereinafter, a method of multiplexing a D2D discovery signal transmission and a WAN signal transmission will be described.

First, D2D discovery type 1 considers a D2D resource set in a D2D resource period. D2D communication (e.g., SA in mode 2) considers a resource pool for a D2D signal transmission.

Case 3 also assumes that the considerations of WAN signal transmission are the same as described above, and a method obtained by applying the following description to the methods proposed in Case 2 may be utilized as a method for Case 3.

First, an embodiment will be described in which a WAN uplink signal that is scheduled in advance is preferentially transmitted to a D2D UE, and transmission (or monitoring of transmission) of a D2D signal is not performed. Through the above, deterioration in WAN performance may be minimized.

As an embodiment (3-1), when a WAN uplink transmission is scheduled or configured in advance in a D2D discovery (e.g., type 1/2) resource set or a resource pool (transmission resource pool) for transmission of a D2D communication signal (SA in mode 2), a WAN uplink signal is preferentially transmitted and a D2D signal (e.g., a D2D discovery signal or a D2D communication signal) is not transmitted.

As an example (3-1-1), the case in which a WAN uplink signal is preferentially transmitted corresponds to the remaining cases, excluding the case in which an SRS or a CSI (e.g., periodic CSI and/or aperiodic CSI) is transmitted in a resource set for transmission of a D2D discovery signal (type 1/2) or in a resource pool for transmission of a D2D communication signal (SA, mode 1/2). That is, only when an SRS or a CSI from among WAN uplink signals is transmitted in a D2D transmission resource set or in a resource pool for transmission of a D2D communication signal, a D2D UE preferentially transmits a D2D signal, and may drop the SRS or the CSI, which is the corresponding WAN uplink transmission signal.

As another example (3-1-2), when transmission of an aperiodic SRS or aperiodic CSI is performed at the same time as transmission (or monitoring of transmission) of a D2D signal in the same uplink subframe, the aperiodic SRS or the aperiodic CSI is transmitted and the transmission (or monitoring of the transmission) of the D2D signal may be skipped. In this instance, when transmission of a periodic SRS or a periodic CSI is performed at the same time as transmission of a D2D signal in the same uplink subframe, the transmission (or monitoring of the transmission) of the D2D signal is performed and the transmission of the periodic SRS or the periodic CSI may be dropped.

As another example (3-1-3), when a reporting type of a CSI reporting is at least one of "3, 5, 6, and 2a", the corresponding CSI reporting may be performed and transmission of a D2D signal may be dropped. That is, in a D2D resource, a WAN uplink transmission associated with a CSI reporting of "type 3, 5, 6, or 2a" is performed in preference to transmission of a D2D signal.

Second, according to another embodiment (3-2), a WAN uplink signal associated with a PUCCH or a PUSCH (or a PUSCH retransmission) and including at least one piece of control information is preferentially transmitted in a D2D discovery (e.g., type 1/2) resource set or in a resource pool for transmission of a D2D communication (SA, mode 1/2) signal, and a D2D signal transmission is skipped. The PUCCH or PUSCH including the at least one piece of control information may be, for example, a PUCCH or a PUSCH including at least one of: a PRACH, a HARQ-ACK, an SR (or BSR), a message responsive to an RAR message (e.g., message 3), and Data (PUSCH) retransmissions.

In this instance, transmission of a WAN uplink signal associated with a PUCCH or a PUSCH including information other than the corresponding control information may be skipped, and a D2D signal is transmitted in the corresponding D2D discovery resource set or in the resource pool for transmission of a D2D communication signal.

Through the above, a WAN uplink transmission that transfers main control information may be secured in preference to a D2D signal.

Third, according to another embodiment (3-3), one of the DL-reference UL/DL configurations (e.g., Table 3), defined as a downlink HARQ timing (DL HARQ timing) for an FDD secondary serving cell in "TDD(PCell)-FDD(SCell) CA in self-scheduling," is configured through a higher layer scheduling in a D2D discovery (e.g., type 1/2) resource set or in a resource pool for transmission of a D2D communication (e.g., SA, mode 1/2) signal. Through the above, the effect of a HARQ-ACK transmission associated with a downlink PDSCH transmission among WAN uplink transmission signals may be minimized. An eNB appropriately schedules (or configures) a transmission resource and may enable data (e.g., a PUSCH) and a signal (e.g., a CSI, SRS, SR, PRACH, or the like), which need to be transferred in another uplink, to be transferred in resources excluding a D2D resource.

According to an embodiment, a higher layer signal may be configured in a DL-reference UL-DL configuration sub-set including some of the seven DL-reference UL/DL configurations of Table 3, as opposed to being configured to support all of the seven DL-reference UL/DL configurations. In this instance, the DL-reference UL-DL configuration sub-set may be configured to always include DL-reference UL-DL configuration #5.

For example, an eNB may select one of DL reference UL-DL configurations #2, #4, and #5 from a higher layer signal, which is configured in a DL-reference UL-DL configuration sub-set including DL reference UL-DL configurations #2, #4, or #5 having the relatively low frequency of a HARQ-ACK transmission, and may set the selected DL-reference UL-DL configuration for D2D UEs.

As another example, when it is inevitable that a limited WAN signal transmission and a D2D signal transmission are performed (that is, collide) in the same resource even though the above described embodiment is used, an eNB and a UE may always perform a WAN signal transmission first. For example, when an uplink resource environment is limited due to "TDD, a limited system BW, or a WAN uplink SPS transmission" or the like and thus a WAN signal transmission and a D2D signal transmission collide, an eNB and a UE may always perform a WAN signal transmission first.

The above described embodiment takes as a given that a HARQ-ACK transmission operated in an FDD band may be performed in all uplink subframes (e.g., a subframe n) based on scheduling in a downlink subframe (e.g., subframe n−4). A HARQ-ACK transmission in a D2D resource may be avoided through scheduling constraints, such as an uplink data scheduling, but this may cause deterioration in WAN downlink performance. Therefore, the above described embodiment may avoid the collision between a HARQ-ACK transmission and a D2D resource and, at the same time, may apply the downlink HARQ timing (DL HARQ timing) introduced in TDD-FDD CA, thereby becoming capable of performing data scheduling in all FDD downlink subframes.

Fourth, according to another embodiment (3-4), when a collision with a WAN uplink transmission occurs in the resources of a D2D discovery (type 1/2) resource set, a D2D discovery signal is always transmitted (or only a D2D discovery signal of type 1 is transmitted). When a collision with a WAN uplink signal occurs in a resource pool for transmission of a D2D communication (SA) signal, a WAN uplink signal is always transmitted.

The embodiments of Case 3 may be applied to only a single D2D signal (e.g., a D2D communication signal (mode 1/2)), a D2D discovery signal (type 1/2), or a synchronization signal (D2DSS or PD2DSCH). Alternatively, the embodiments of Case 3 may be applied to only some D2D signals, or may be applied to only a predetermined mode or type.

<Case 4: Multiplexing a D2D Tx and a WAN Rx>

On a single carrier (e.g., on an uplink spectrum of an FDD carrier), a D2D Tx in the uplink and a WAN Rx in the downlink may be performed in parallel as before, and thus, multiplexing may not be needed.

Although Case 1 to Case 4 have been described based on an FDD carrier, the descriptions may also be applied to TDD. In this instance, TDD considers an uplink subframe, instead of an uplink spectrum on an FDD carrier. Particularly, the embodiment may be utilized for multiplexing a D2D transmission and a WAN transmission.

Figure 22:
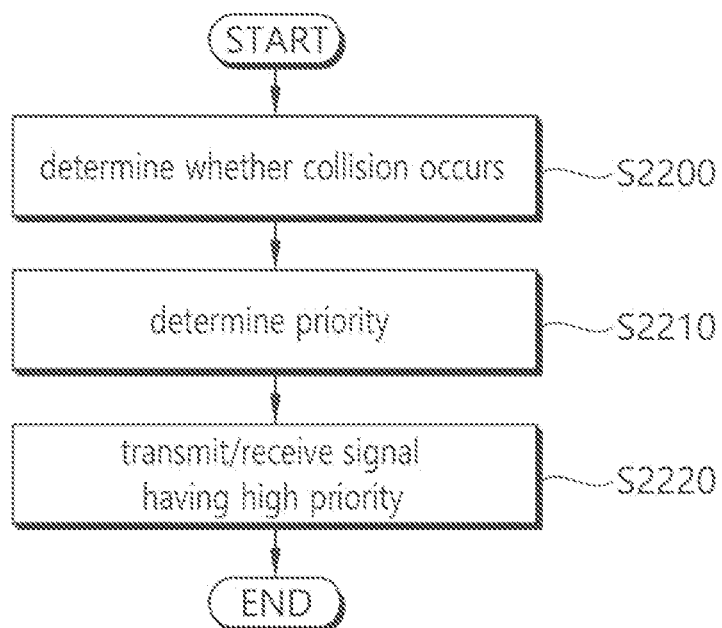
FIG. 22 is a flowchart illustrating operations of a UE according to the present disclosure.

FIG. 22 is an example of a flowchart illustrating operations of a UE according to the present disclosure.

Referring to FIG. 22, a UE determines whether a D2D transmission/reception and a WAN transmission/reception collide in operation S2200. That is, the UE determines whether a collision occurs because a D2D signal transmission/reception and a WAN signal transmission/reception are configured or scheduled to be performed in parallel in the same spectrum/subframe.

When a collision occurs, the UE determines priority of the D2D transmission/reception and the WAN transmission/reception in operation S2210. The UE determines a signal to be transmitted/received according to Case 1 through Case 4 described in FIGS. 13 to 21, and performs multiplexing.

The UE transmits or receives the corresponding signal to a UE or an eNB according to the determination in operation S2220.

Figure 23:
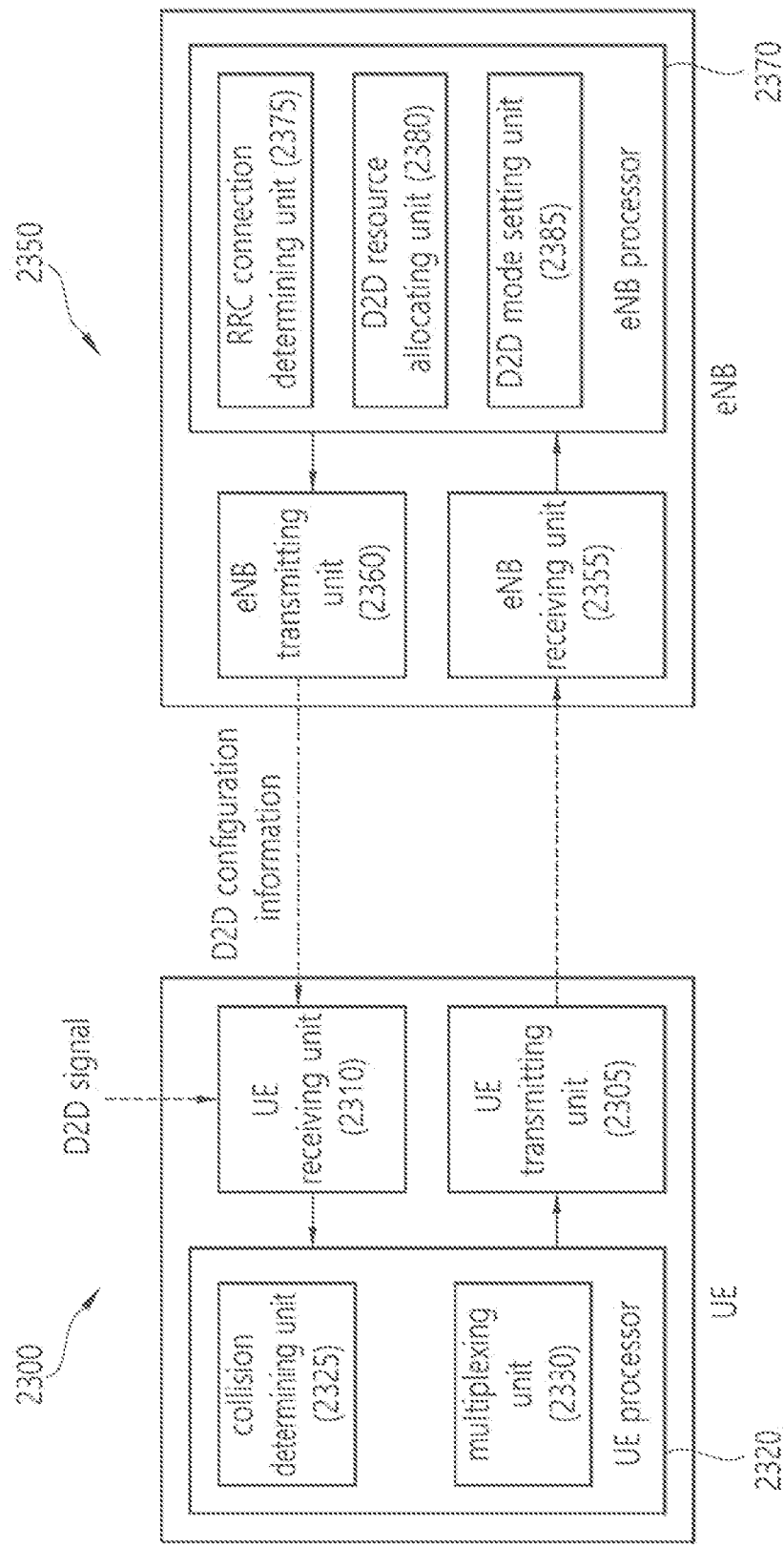
FIG. 23 is an apparatus block diagram illustrating a wireless communication system according to the present disclosure.

FIG. 23 is an example of an apparatus block diagram of a wireless communication system according to the present disclosure.

Referring to FIG. 23, a UE 2300 includes a UE transmitting unit 2305, a UE receiving unit 2310, and a UE processor 2320. The UE may further include a memory (not illustrated). The memory is connected with the UE processor 2320, and stores various pieces of information used for operating the UE processor 2320. In the above described embodiments, the operations of the UE 2300 may be implemented under the control of the processor 2320. The UE processor 2320 may further include a collision determining unit 2325 and a multiplexing unit 2330.

The UE transmitting unit 2305 executes transmission of a D2D signal or transmission of a WAN signal.

The UE receiving unit 2310 executes reception of a D2D signal or reception of a WAN signal.

The collision determining unit 2325 determines whether a collision occurs because a D2D signal transmission/reception and a WAN signal transmission/reception are set or scheduled to simultaneously performed in the same spectrum/subframe.

The multiplexing unit 2330 may determine a signal to be transmitted/received in the corresponding spectrum/subframe according to Case 1 through Case 4 described in FIGS. 13 to 21. The multiplexing unit 2330 may be also referred to as a scheduling unit because it performs the function of scheduling a signal to be transmitted/received.

More particularly, a multiplexing method according to Case 1 through Case 4 will be described as follows.

According to Case 1 (D2D Rx and WAN Rx), the multiplexing unit 2330 may perform multiplexing to enable a D2D UE to monitor reception of a D2D discovery signal on an uplink spectrum. The multiplexing unit 2330 may also perform multiplexing to enable a D2D UE to not monitor any signal on a downlink spectrum or in a spectrum/subframe configured as resources or a resource pool for reception of a D2D discovery signal within each D2D discovery period.

As another example, the multiplexing unit 2330 may perform multiplexing to enable a D2D UE to monitor a WAN signal reception on a downlink spectrum and to perform a related operation when a subframe that an eNB transfers through a WAN Rx signal is at least one of the subframes of Table 1 (signals for maintaining a link with a WAN and for effectively responding to a predetermined service), with respect to a subframe configured as a resource or a resource pool for reception of a D2D discovery signal within each D2D discovery period.

Conversely, when the subframe that the serving eNB transfers through the WAN Rx signal is different from the subframes of Table 1, the multiplexing unit 2330 may perform multiplexing to enable the D2D UE to monitor reception of a D2D discovery signal on an uplink spectrum and not to monitor any signal on a downlink spectrum.

As another example, the multiplexing unit 2330 may perform multiplexing to a D2D UE to monitor reception of a D2D discovery signal only in some resources of subframes configured as a resource pool for reception of a D2D discovery signal. In this instance, the multiplexing unit 2330 may perform multiplexing to the D2D UE to always monitor reception of a D2D discovery signal on an uplink spectrum in only the corresponding resources, and to monitor reception of a WAN signal on a downlink spectrum in the remaining D2D discovery resources.

As another example, the multiplexing unit 2330 may perform multiplexing in a D2D UE to monitor a D2D discovery reception on an uplink spectrum until a D2D discovery signal is received in the first D2D discovery resource from among the subframes configured as a resource pool for a D2D discovery reception, and until an MAC PDU of the corresponding D2D discovery signal is successfully received or decoded.

As another example, the multiplexing unit 2330 may perform multiplexing in a D2D UE to always monitor reception of a communication signal on an uplink spectrum in the subframes of a resource pool for reception of a D2D communication signal, and to not monitor reception of a communication signal on a downlink spectrum in the subframes of the corresponding reception resource pool.

As another example, the multiplexing unit 2330 may perform multiplexing in a D2D UE to monitor reception on a downlink spectrum and also to perform a related operation when information transferred by a corresponding serving eNB through a WAN Rx on a downlink spectrum in the subframes of a resource pool for reception of a D2D communication signal is at least one of the subframes of Table 2. Otherwise, the D2D UE monitors reception of a D2D communication signal.

According to Case 2 (D2D Rx and WAN Tx), the multiplexing unit 2330 performs multiplexing in a D2D UE to preferentially transmit a WAN uplink signal and to not perform monitoring (or decoding) of D2D signal reception when transmission of a WAN uplink signal is scheduled or configured in advance in a resource pool for reception of a D2D signal or in the resources for reception in a resource pool. For example, only when transmission of an SRS or a CSI from among WAN uplink signals occurs in a D2D reception resource pool (or in configured resources), the multiplexing unit 2330 may perform multiplexing in a D2D UE to monitor reception of a D2D signal and to drop the SRS or the CSI, which is the corresponding WAN uplink transmission signal. As another example, when transmission of an aperiodic SRS or an aperiodic CSI occurs at the same time as monitoring reception of a D2D signal in the same uplink subframe, the multiplexing unit 2330 may perform multiplexing in a D2D UE to transmit the aperiodic SRS or the aperiodic CSI and to skip monitoring of D2D signal reception. As another example, when the reporting type of a CSI report is at least one of "3, 5, 6, and 2a", the multiplexing unit 2330 may perform multiplexing in a D2D UE to perform the corresponding CSI reporting and to drop reception of a D2D signal.

As another example, when a WAN uplink signal associated with a PUCCH or a PUSCH and including at least one piece of control information is scheduled in a resource pool for a D2D discovery signal or a D2D communication signal reception or resources for reception in a resource pool, the multiplexing unit 2330 may perform multiplexing in a D2D UE to preferentially transmit a WAN uplink signal, and to skip monitoring of a D2D signal reception.

As another example, the multiplexing unit 2330 may perform multiplexing in a D2D UE to configure one of DL-reference UL/DL configurations defined as a downlink HARQ timing for an FDD secondary serving cell in "TDD-FDD TDD(PCell)-FDD(SCell) CA in self-scheduling" in a resource pool for a D2D discovery or D2D communication reception or resources for reception in a resource pool, through a higher layer signal.

As another example, the multiplexing unit 2330 may perform multiplexing to enable a D2D UE to always receive a D2D discovery signal when a collision with a WAN uplink transmission occurs in a resource pool for reception of a D2D discovery signal or in the resources for reception in a resource pool, and may perform multiplexing to enable the D2D UE to always transmit a WAN uplink signal when a collision with a WAN uplink transmission occurs in a resource pool for reception of a D2D communication signal or the resources for reception in a resource pool.

According to Case 3 (a D2D Tx and a WAN Tx), the multiplexing unit 2330 may perform multiplexing by applying the embodiment of Case 2 to a D2D Tx, as opposed to a D2D Rx.

In the case of D2D discovery type 1, the multiplexing unit 2330 may perform multiplexing when a collision with a WAN transmission signal occurs in a D2D discovery resource set to be utilized for transmission of a D2D discovery signal. In this instance, a resource for transmission of D2D discovery signal type 1 is randomly selected by a Tx UE, and an eNB 2350 may not have information about whether the corresponding resource is to be used by the Tx D2D UE.

Conversely, in the case of D2D discovery type 2B, the multiplexing unit 2330 may perform multiplexing when a collision with a WAN signal transmission occurs in a D2D discovery resource indicated by the eNB 2350. In D2D discovery type 2B, the eNB 2350 controls the utilization of resources more closely when compared to D2D discovery type 1, and thus, a collision between a D2D discovery signal transmission and a WAN transmission signal may be avoided according to scheduling or configuration by the eNB.

The eNB 2350 includes an eNB receiving unit 2355, an eNB transmitting unit 2360, and an eNB processor 2370. The eNB 2350 may further include a memory (not illustrated). The memory is connected with the eNB processor 2370, and stores various pieces of information used for operating the eNB processor 2370. In the above described embodiments, the operations of the eNB 2350 may be implemented under the control of the eNB processor 2370. The eNB processor 2370 may include an RRC connection determining unit 2375, a D2D resource allocation unit 2380, and a D2D mode setting unit 2385.

The eNB transmitting unit 2360 may transmit D2D configuration information to the UE 2300.

The RRC connection determining unit 2375 may determine whether the UE 2300 is in an idle mode or an RRC-connected mode.

The D2D mode setting unit 2385 may set a D2D mode of the UE 2300.

The D2D resource allocation unit 2380 may generate information associated with a resource pool for D2D communication, based on whether the UE 2300 is in an idle mode or an RRC-connected mode. Also, the D2D resource allocation unit 2380 may generate D2D configuration information. The D2D configuration information may include configuration information associated with D2D discovery type 1/type 2, information associated with a corresponding Tx/Rx resource pool, and the like. The D2D configuration information may include information associated with a D2D resource pool for D2D mode 2/mode 1. A resource for monitoring a D2D discovery reception may be configured in the form of a subset, which is smaller than or equal to the D2D discovery resource pool. The D2D configuration information may include information associated with a D2D monitoring period (i.e., monitoring resource information). The monitoring resource information may include only information associated with a period where D2D signals of D2D UEs that access a network of a single operator are monitored, or may also include information associated with a period where D2D signals of D2D UEs that access the network of another operator are monitored.

What is claimed is:
1. A first wireless user device comprising:
a wireless transceiver comprising at least one antenna;
one or more processors; and
memory storing instructions that, when executed by the one or more processors, cause the first wireless user device to:
receive, via Radio Resource Control (RRC) signaling, information of a resource pool for device-to-device communication between the first wireless user device and at least one second wireless user device, wherein the information of the resource pool comprises information of a plurality of time durations in which device-to-device communication is configured to be performed, and wherein the first wireless user device is configured to not receive, during the plurality of time durations, downlink channels from serving cells of a base station except during a random access (RA) procedure;
transmit a RA preamble via a Physical Random Access Channel (PRACH); and
receive, based on a first time duration, of the plurality of time durations, corresponding to a time duration for monitoring a RA response associated with the RA preamble, the RA response during the first time duration.
2. The first wireless user device of claim 1, wherein the instructions, when executed by the one or more processors, cause the first wireless user device to:

based on the first time duration corresponding to the time duration for monitoring the RA response, not receive a device-to-device signal during the first time duration.

3. The first wireless user device of claim 1, wherein the plurality of time durations comprises a second time duration in which second device-to-device communication is to be performed, and wherein the second device-to-device communication is prioritized over a communication that is not associated with a RA procedure; and wherein the instructions, when executed by the one or more processors, cause the first wireless user device to:
based on the second time duration not associated with the RA procedure, monitor the second device-to-device communication during the second time duration.

4. The first wireless user device of claim 3, wherein the instructions, when executed by the one or more processors, cause the first wireless user device to:
refrain from monitoring downlink communication from the base station while monitoring the second device-to-device communication during the second time duration.

5. The first wireless user device of claim 1, wherein the plurality of time durations comprises a second time duration in which second device-to-device communication is to be performed, and wherein the second device-to-device communication is prioritized over communication not associated with the RA procedure; and wherein the instructions, when executed by the one or more processors, cause the first wireless user device to:
based on the second time duration not associated with the RA procedure, perform transmission of the second device-to-device communication during the second time duration.

6. The first wireless user device of claim 1, wherein the instructions, when executed by the one or more processors, cause the first wireless user device to:
receive the RA response during the first time duration.

7. The first wireless user device of claim 1, wherein the RA procedure is prioritized over device-to-device communication.

8. The first wireless user device of claim 1, wherein device-to-device communication comprises sidelink discovery reception.

9. The first wireless user device of claim 1, wherein device-to-device communication comprises sidelink discovery transmission.

10. The first wireless user device of claim 1, wherein, in at least one of the plurality of time durations, device-to-device communication that overlaps with an uplink transmission is prioritized over the uplink transmission.

11. A method performed by a first wireless user device, the method comprising:
receiving, via Radio Resource Control (RRC) signaling, information of a resource pool for device-to-device communication between the first wireless user device and at least one second wireless user device, wherein the information of the resource pool comprises information of a plurality of time durations in which device-to-device communication is configured to be performed, and wherein the first wireless user device is configured to not receive, during the plurality of time durations, downlink channels from serving cells of a base station except during a random access (RA) procedure;

transmitting a RA preamble via a Physical Random Access Channel (PRACH); and receiving, based on a first time duration, of the plurality of time durations, corresponding to a time duration for monitoring a RA response associated with the RA preamble, the RA response during the first time duration.

12. The method of claim 11, further comprising:
based on the first time duration corresponding to the time duration for monitoring the RA response, skipping monitoring of a device-to-device signal during the first time duration.

13. The method of claim 11, wherein the plurality of time durations comprises a second time duration in which second device-to-device communication is to be performed, and wherein the second device-to-device communication is prioritized over a communication that is not associated with a RA procedure; and wherein the method further comprises:
based on the second time duration not associated with the RA procedure, monitoring the second device-to-device communication during the second time duration.

14. The method of claim 13, further comprising:
refrain from monitoring downlink communication from the base station while monitoring the second device-to-device communication during the second time duration.

15. The method of claim 11, wherein the plurality of time durations comprises a second time duration in which second device-to-device communication is to be performed, and wherein the second device-to-device communication is prioritized over communication not associated with the RA procedure; and wherein the method further comprises:
based on the second time duration not associated with the RA procedure, performing transmission of the second device-to-device communication during the second time duration.

16. The method of claim 11, further comprising:
receiving the RA response during the first time duration.

17. The method of claim 11, wherein the RA procedure is prioritized over device-to-device communication.

18. The method of claim 11, wherein device-to-device communication comprises sidelink discovery reception.

19. The method of claim 11, wherein device-to-device communication comprises sidelink discovery transmission.

20. The method of claim 11, wherein, in at least one of the plurality of time durations, device-to-device communication that overlaps with an uplink transmission is prioritized over the uplink transmission.

* * * * *